US012189331B2

(12) United States Patent
Yogosawa et al.

(10) Patent No.: US 12,189,331 B2
(45) Date of Patent: Jan. 7, 2025

(54) POSITIONING MEMBER, HOLDING DEVICE, PROCESS CARTRIDGE, AND IMAGE FORMING APPARATUS

(71) Applicants: Kazuki Yogosawa, Tokyo (JP); Tatsuya Kubo, Kanagawa (JP); Yuuki Tsuchiya, Kanagawa (JP); Shinya Karasawa, Kanagawa (JP)

(72) Inventors: Kazuki Yogosawa, Tokyo (JP); Tatsuya Kubo, Kanagawa (JP); Yuuki Tsuchiya, Kanagawa (JP); Shinya Karasawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/015,083

(22) PCT Filed: Aug. 17, 2021

(86) PCT No.: PCT/IB2021/057539
§ 371 (c)(1),
(2) Date: Jan. 9, 2023

(87) PCT Pub. No.: WO2022/053895
PCT Pub. Date: Mar. 17, 2022

(65) Prior Publication Data

US 2023/0315006 A1 Oct. 5, 2023

(30) Foreign Application Priority Data

Sep. 10, 2020 (JP) ................................ 2020-152338
Sep. 18, 2020 (JP) ................................ 2020-157218

(51) Int. Cl.
*G03G 21/18* (2006.01)
*G03G 15/00* (2006.01)
(Continued)

(52) U.S. Cl.
CPC ..... *G03G 21/1842* (2013.01); *G03G 15/0121* (2013.01); *G03G 15/0813* (2013.01);
(Continued)

(58) Field of Classification Search
CPC ........... G03G 15/0121; G03G 15/0813; G03G 15/0935; G03G 15/751; G03G 15/757;
(Continued)

(56) References Cited

U.S. PATENT DOCUMENTS 5,581,328 A 12/1996 Yashiro
5,842,100 A 11/1998 Yanashima et al.
(Continued)

FOREIGN PATENT DOCUMENTS

CN 1294323 A 5/2001
CN 103969989 A 8/2014
(Continued)

OTHER PUBLICATIONS

International Search Report issued on Nov. 2, 2021 in PCT/IB2021/057539 filed on Aug. 17, 2021, 13 pages.
(Continued)

*Primary Examiner* — Joseph S Wong
(74) *Attorney, Agent, or Firm* — XSENSUS LLP

(57) ABSTRACT

A positioning member defines a facing distance between a first rotating body and a second rotating body. The positioning member includes a fitting portion, a groove, and a restricting member. A fitted portion of the first rotating body is to be rotatably fitted into the fitting portion. The groove has a groove shape extending in a predetermined direction from an opening to an abutting portion. A shaft portion of the second rotating body is to be slidably movable in the groove. The restricting member restricts movement of the shaft portion in the predetermined direction in a state in which the
(Continued)

shaft portion abuts on the abutting portion in the groove. The restricting member is detachably disposed on the groove.

20 Claims, 9 Drawing Sheets

(51) Int. Cl.

| | |
|---|---|
| ***G03G 15/01*** | (2006.01) |
| ***G03G 15/08*** | (2006.01) |
| ***G03G 15/09*** | (2006.01) |
| ***G03G 21/16*** | (2006.01) |

(52) U.S. Cl.
CPC ....... *G03G 15/0935* (2013.01); *G03G 15/751* (2013.01); *G03G 15/757* (2013.01); *G03G 21/1647* (2013.01); *G03G 21/1671* (2013.01); *G03G 21/1676* (2013.01); *G03G 21/1814* (2013.01); *G03G 21/1817* (2013.01); *G03G 21/1821* (2013.01)

(58) Field of Classification Search
CPC ........... G03G 21/1647; G03G 21/1671; G03G 21/1676; G03G 21/1814; G03G 21/1817; G03G 21/1821; G03G 21/1842
See application file for complete search history.

(56) References Cited

U.S. PATENT DOCUMENTS

| | | | | |
|---|---|---|---|---|
| 2006/0002736 | A1 | 1/2006 | Kikuchi et al. | |
| 2006/0039717 | A1 | 2/2006 | Hatori | |
| 2008/0138109 | A1 | 6/2008 | Anan et al. | |
| 2008/0310881 | A1* | 12/2008 | Sato .................. | G03G 15/0813<br>399/113 |
| 2010/0239312 | A1 | 9/2010 | Kikuchi et al. | |
| 2013/0121725 | A1* | 5/2013 | Shirayanagi ....... | G03G 21/1814<br>399/111 |
| 2016/0216688 | A1* | 7/2016 | Katayama .......... | G03G 21/1814 |
| 2021/0080856 | A1 | 3/2021 | Hashikawa et al. | |

FOREIGN PATENT DOCUMENTS

| | | | |
|---|---|---|---|
| CN | 209667543 | U | 11/2019 |
| EP | 0 473 303 | A1 | 3/1992 |
| EP | 0672973 | A2 | 9/1995 |
| JP | H05-107822 | A | 4/1993 |
| JP | H08-076667 | A | 3/1996 |
| JP | H09-120251 | A | 5/1997 |
| JP | H10-048993 | A | 2/1998 |
| JP | 2001-013848 | A | 1/2001 |
| JP | 2006-017970 | | 1/2006 |
| JP | 2006-058705 | | 3/2006 |
| JP | 2009-181002 | | 8/2009 |
| JP | 2010-164993 | A | 7/2010 |
| JP | 2014-139654 | | 7/2014 |
| JP | 2017-151358 | A | 8/2017 |
| JP | 2018-097244 | A | 6/2018 |
| JP | 2018-173508 | | 11/2018 |

OTHER PUBLICATIONS

Office Action issued Jan. 24, 2024 in Japanese Patent Application No. 2020-152338, 7 pages.
Office Action issued Mar. 29, 2024 in Japanese Patent Application No. 2020-157218, 7 pages.
Office Action issued Oct. 31, 2024 in Chinese Patent Application No. 202180054213.0, 6 pages.

* cited by examiner

POSITIONING MEMBER, HOLDING DEVICE, PROCESS CARTRIDGE, AND IMAGE FORMING APPARATUS

CROSS-REFERENCE TO RELATED APPLICATIONS

The present application is based on PCT/IB2021/057539, filed on Aug. 17, 2021, which claims priority to JP 2020-152338, filed Sep. 10, 2020, and JP 2020-157218, filed Sep. 18, 2020, the entire contents of each are incorporated herein by reference.

TECHNICAL FIELD

Embodiments of the present invention relate to a positioning member that defines a facing distance between two rotating bodies, a holding device that rotatably holds each of the two rotating bodies, a process cartridge detachably installed with respect to an image forming apparatus body, and an image forming apparatus such as a copier, a printer, a facsimile machine, a multifunction peripheral thereof, or the like.

BACKGROUND ART

Conventionally, in a process cartridge installed in an image forming apparatus such as a copier, a printer, and the like, for the purpose of setting a gap (facing distance) between a developing roller (developer bearer) and a photoconductor drum (image bearer) with high accuracy, a technique of providing a faceplate (positioning member) for fitting a shaft portion of the developing roller and a shaft portion of the photoconductor drum to each other is known (see, for example, PTL 1 and the like).

Specifically, the faceplate (positioning member) in PTL 1 and the like is provided with a through-hole fitted to the shaft portion of the developing roller of the developing device and a through-hole fitted to the shaft portion of the photoconductor drum. Then, by fitting the shaft portion of the developing roller and the shaft portion of the photoconductor drum respectively into the two through-holes of the faceplate, an inter-shaft distance between the developing roller and the photoconductor drum is defined, and a gap between the developing roller and the photoconductor drum is set with high accuracy.

CITATION LIST

Patent Literature

[PTL 1]
Japanese Patent No. 6202387 (Japanese Unexamined Patent Application Publication No. 2014-139654)

SUMMARY OF INVENTION

Technical Problem

In a conventional process cartridge, when maintenance or replacement of a developer bearer (second rotating body) is performed, after a plurality of screws for securing a positioning member (faceplate) to the process cartridge are removed, the positioning member is removed from the process cartridge, and the image bearer (first rotating body) and the developing device need to be separated from the positioning member. Therefore, it takes time and effort involved in maintenance and replacement of the developer bearer.

The present invention has been made to solve the above-described problems, and it is an object of the present invention to provide a positioning member, a holding device, a process cartridge, and an image forming apparatus, which reduce time and effort involved in maintenance and replacement.

Solution to Problem

A positioning member defines a facing distance between a first rotating body and a second rotating body. The positioning member includes a fitting portion, a groove, and a restricting member. A fitted portion of the first rotating body is to be rotatably fitted into the fitting portion. The groove has a groove shape extending in a predetermined direction from an opening to an abutting portion. A shaft portion of the second rotating body is to be slidably movable in the groove. The restricting member restricts movement of the shaft portion in the predetermined direction in a state in which the shaft portion abuts on the abutting portion in the groove. The restricting member is detachably disposed on the groove.

Advantageous Effects of Invention

According to the present disclosure, there can be provided a positioning member, a holding device, a process cartridge, and an image forming apparatus that reduce time and effort involved in maintenance and replacement.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 9A and 9B are top views illustrating a main part of the positioning member in FIG. 8, in which FIG. 9A is a diagram illustrating a state in which a leaf spring is not installed, and FIG. 9B is a diagram illustrating a state in which the leaf spring is installed.

DESCRIPTION OF EMBODIMENTS

Figure 1:
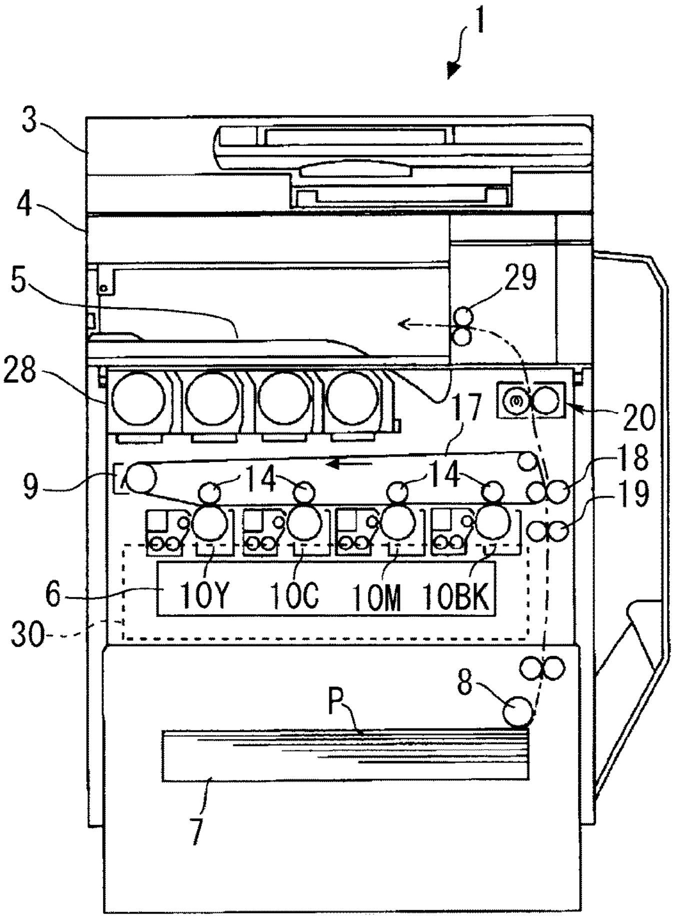
FIG. 1 is a general configuration diagram illustrating an image forming apparatus according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to the drawings, embodiments of the present invention are described below. Note that identical parts are given identical reference numerals and redundant descriptions are summarized or omitted accordingly.

Initially with reference to FIG. 1, an entire configuration and operation of an image forming apparatus 1 are described below. In FIG. 1, the image forming apparatus 1 is illustrated as a color copier as an example of an image forming apparatus according to an embodiment of the present invention. The image forming apparatus 1 includes a document conveying unit 3 that conveys a document to a document reading unit 4, a document reading unit 4 that reads image data of a document, and a writing unit (exposure unit) 6 that emits laser beam based on input image data. In addition, the image forming apparatus 1 includes a sheet feeder 7 that stores a sheet P such as a sheet, process cartridges (holding devices) 10Y, 10M, 10C, and 10BK as image forming devices corresponding to different colors of yellow, magenta, cyan, and black, respectively, an intermediate transfer belt 17 to which toner images of a plurality of colors are transferred in an overlapping manner, and a secondary transfer roller 18 that transfers the toner images formed on the intermediate transfer belt 17 to the sheet P. Further, the image forming apparatus 1 includes a fixing device 20 that fixes an unfixed image on the sheet P, a toner container 28 to supply toners of the respective colors to developing devices of the process cartridges 10Y, 10M, 10C, and 10BK, and a waste-toner container 30 in which waste toner is collected.

Figure 2:
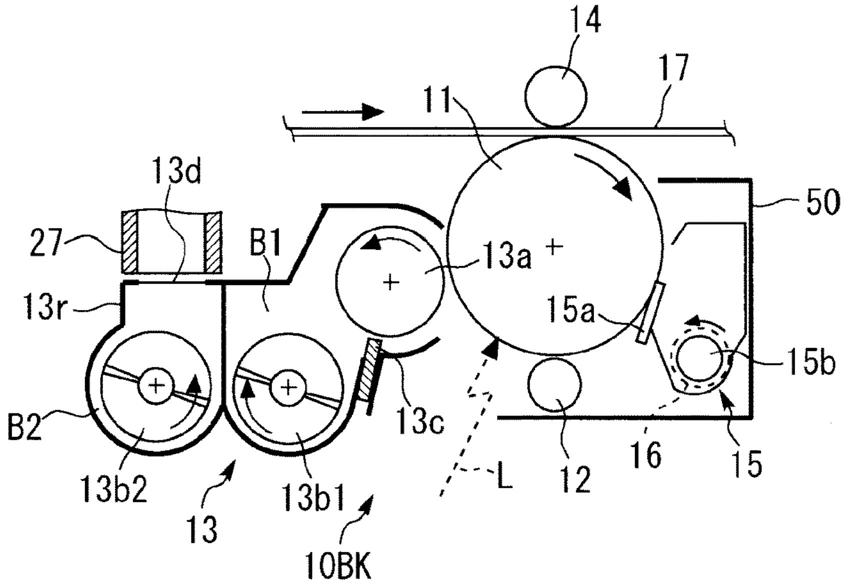
FIG. 2 is a configuration diagram illustrating an image forming device according to an embodiment of the present invention.

Here, each of the process cartridges 10Y, 10M, 10C, and 10BK (image forming device and holding device) is made by integrating a photoconductor drum 11 as an image bearer, a charging device 12, a developing device 13, and a cleaning device 15 (see FIG. 2). Then, each of the process cartridges 10Y, 10M, 10C, and 10BK is replaced with a new one when the life reaches its end. On the photoconductor drum 11 (image bearer) in each of the process cartridges 10Y, 10M, 10C, and 10BK, a toner image of each color (yellow, magenta, cyan, and black) is formed.

Hereinafter, an operation of the image forming apparatus when forming a normal color image will be described. First, a document is conveyed from a document tray by a conveyance roller of the document conveying unit 3 and placed on a contact glass of the document reading unit 4. Then, the image data of the document placed on the contact glass is optically read by the document reading unit 4. Then, the image data of each color of yellow, magenta, cyan, and black is transmitted to the writing unit 6. Then, laser beam (exposure beam) based on the image data of each color is emitted from the writing unit 6 toward the photoconductor drums 11 of the corresponding process cartridges 10Y, 10M, 10C, and 10BK, respectively.

On the other hand, the four photoconductor drums 11 each rotate in the clockwise direction in FIGS. 1 and 2. Then, referring to FIG. 2, first, the surface of the photoconductor drum 11 is uniformly charged at a position facing the charging device 12 (charging roller) (a charging step). In this way, a charging potential is formed on the photoconductor drum 11. Subsequently, the charged surface of the photoconductor drum 11 reaches the irradiation position of each laser beam. In the writing unit 6, the laser beam L corresponding to the image signal is emitted from the light source in accordance with each color. The laser beam L is incident on a polygon mirror, reflected, and then transmitted through a plurality of lenses. The laser beam after being transmitted through the plurality of lenses passes through different optical paths for each color component of yellow, magenta, cyan, and black (an exposure step).

The surface of the photoconductor drum 11 of the process cartridge 10Y being first from the left side of the surface of the paper is irradiated with the laser beam corresponding to the yellow component. In this way, an electrostatic latent image corresponding to the yellow component is formed on the photoconductor drum 11 charged by the charging roller 12*a*. Similarly, the surface of the photoconductor drum 11 of the process cartridge 10C being second from the left side of the surface of the paper is irradiated with the laser beam of the cyan component to form an electrostatic latent image of the cyan component. The surface of the photoconductor drum 11 of the process cartridge 10M being third from the left side of the surface of the paper is irradiated with the laser beam corresponding to the magenta component to form an electrostatic latent image of the magenta component. The surface of the photoconductor drum 11 of the process cartridge 10BK being fourth from the left side of the surface of the paper is irradiated with the laser beam of the black component to form an electrostatic latent image of the black component.

Subsequently, the surfaces of the photoconductor drums 11 on which the electrostatic latent images of the respective colors are formed respectively reach positions facing the developing devices 13 (see FIG. 2). Then, the toner of each color is supplied from each developing device 13 onto the photoconductor drum 11 to develop the latent image on the photoconductor drum 11 (a developing step). Subsequently, the surfaces of the photoconductor drums 11 after the developing step respectively reach positions facing the intermediate transfer belt 17 (intermediate transferor) as an image bearer. Here, a primary transfer roller 14 is installed at each facing position so as to abut on the inner peripheral surface of the intermediate transfer belt 17. Then, at the position of the primary transfer roller 14, the toner images of the respective colors formed on the photoconductor drums 11 are sequentially superimposed and transferred onto the intermediate transfer belt 17 (a primary transfer step).

Then, the surfaces of the photoconductor drums 11 after the primary transfer step respectively reach a position facing the cleaning device 15 (see FIG. 2). Then, untransferred toner remaining on the photoconductor drum 11 is collected by the cleaning device 15 (a cleaning step). Note that the untransferred toner collected in the cleaning device 15 is conveyed in a conveying pipe 16 by a conveying screw 15*b* (see FIG. 2) and collected in the waste-toner container 30 as waste toner. Subsequently, the surface of the photoconductor drum 11 passes through the position of the electrical discharging device, and a series of image formation processes on the photoconductor drum 11 ends.

On the other hand, the surface of the intermediate transfer belt 17 on which the images of the respective colors on the photoconductor drums 11 are transferred in an overlapping manner travels in a direction indicated by arrow in FIG. 1 and reaches a position of the secondary transfer roller 18. Then, the full-color image on the intermediate transfer belt 17 is secondarily transferred onto the sheet P at the position of the secondary transfer roller 18 (a secondary transfer step). Subsequently, the surface of the intermediate transfer belt 17 reaches a position of an intermediate transfer belt cleaner 9 (cleaning device). Then, the untransferred toner on the intermediate transfer belt 17 is collected by the intermediate transfer belt cleaner 9, and a series of transfer processes on the intermediate transfer belt 17 is completed. Note that the untransferred toner collected in the intermediate transfer belt cleaner 9 is conveyed in the conveying pipe 16 by the conveying screw 15*b* (see FIG. 2) and collected in the waste-toner container 30 as waste toner.

Here, the sheet P at the position of the secondary transfer roller 18 is conveyed from the sheet feeder 7 via a conveyance guide, a registration roller 19, and the like. Specifically, the sheet P fed by a feed roller 8 from the sheet feeder 7 that stores the sheet P is guided to the registration roller 19 after passing through the conveyance guide. The sheet P reaching the registration roller 19 is conveyed toward the position of the secondary transfer roller 18 in synchronization with the toner image on the intermediate transfer belt 17.

Subsequently, the sheet P to which the full-color image has been transferred is guided to the fixing device 20. In the fixing device 20, the color image is fixed on the sheet P at a nip between a fixing roller and a pressure roller. Then, the sheet P after the fixing process is ejected as an output image to the outside of the apparatus body 1 by an output roller pair 29 and then stacked on the sheet ejection unit 5, and a series of image forming processes is completed.

Next, an image forming device of the image forming apparatus will be described in detail with reference to FIGS. 2 and 3. FIG. 2 is a configuration diagram illustrating the process cartridge 10BK for black. The other three process cartridges 10Y, 10M, and 10C are configured substantially similar to the process cartridge 10BK for black except that the color of the toner used in the image formation process is different, and thus, illustration and description thereof are omitted.

As illustrated in FIG. 2, in the process cartridge 10BK as a holding device, mainly, a photoconductor drum 11 as an image bearer, a developing device 13, a charging device 12, and a cleaning device 15 are integrally housed in a cartridge casing 50 (housing). The cleaning device 15 is provided with a cleaning blade 15*a* that comes into contact with the photoconductor drum 11 and a conveying screw 15*b*.

The developing device 13 mainly includes a developing roller 13*a* as a developer bearer that faces the photoconductor drum 11 and forms a developing region, a first conveying screw 13*b*1 (first conveying member) that faces the developing roller 13*a*, a second conveying screw 13*b*2 (second conveying member) that faces the first conveying screw 13*b*1 via a partition member 13*e*, a doctor blade 13*c* (developer regulator) that faces the developing roller 13*a* and regulates the amount of developer borne on the developing roller 13*a*, and the like.

A developer (two-component developer) including a toner and a carrier is accommodated in the developing device 13. The developing roller 13*a* is configured to face the photoconductor drum 11 with a minute gap H (see FIG. 3) to form the developing region. As illustrated in FIG. 3, the developing roller 13*a* includes a magnet 13*al* fixed inside and forming a plurality of poles (magnetic poles) on the outer peripheral surface of the roller and a sleeve 13*a*2 rotating around the magnet 13*a*1.

Figure 3:
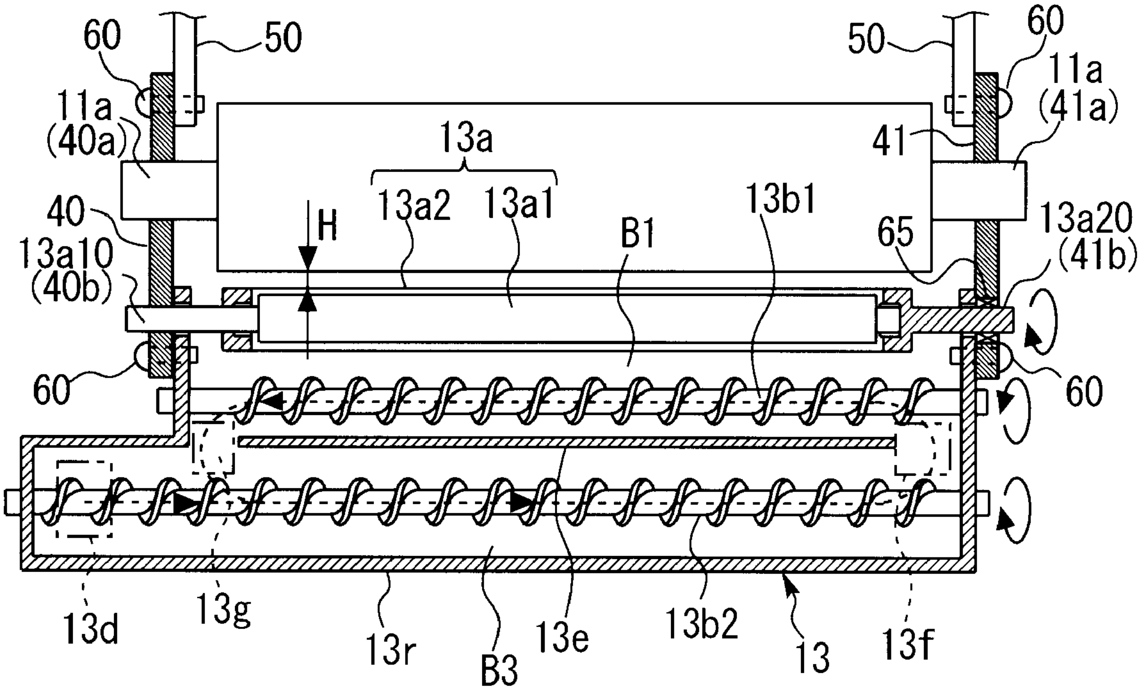
FIG. 3 is a cross-sectional view of a main part of a process cartridge according to an embodiment of the present invention, cut along a longitudinal direction of the process cartridge.

The conveying screws 13*b*1 and 13*b*2 as the conveying members convey the developer accommodated in the developing device 13 in the longitudinal direction and form circulation paths (a circulation path indicated by a broken line arrow in FIG. 3). That is, a circulation path of the developer is formed by a first conveyance path B1 by the first conveying screw 13*b*1 and a second conveyance path B2 by the second conveying screw 13*b*2. The first conveyance path B1 and the second conveyance path B2 are isolated by the partition member 13*e* (wall portion), and both end portions of the two conveyance paths B1 and B2 in the longitudinal direction communicate with each other via communication ports 13*f* and 13*g*. Specifically, referring to FIG. 3, the end portion on the upstream side in the conveyance direction of the first conveyance path B1 communicates with the end portion on the downstream side in the conveyance direction of the second conveyance path B2 via the first communication port 13*f*. In addition, the end portion on the downstream side in the conveyance direction of the first conveyance path B1 communicates with the end portion on the upstream side in the conveyance direction of the second conveyance path B2 via the second communication port 13*g*. That is, the partition member 13*e* is disposed at a position excluding both ends in the longitudinal direction. The first conveying screw 13*b*1 (first conveyance path B1) is disposed so as to face the developing roller 13*a*, and the second conveying screw 13*b*2 (second conveyance path B2) is disposed so as to face the first conveying screw 13*b*1 (first conveyance path B1) via the partition member 13*e*. The first conveying screw 13*b*1 supplies the developer toward the developing roller 13*a* while conveying the developer in the longitudinal direction and collects the developer after the developing step separated from the developing roller 13*a*. The second conveying screw 13*b*2 stirs and mixes the developer after the developing step conveyed from the first conveyance path B1 and the fresh developer supplied from the toner supply inlet 13*d* while conveying them in the longitudinal direction. In the present embodiment, the two conveying screws 13*b*1 and 13*b*2 (conveying members) are arranged side by side in the horizontal direction. In each of the two conveying screws 13*b*1 and 13*b*2, a screw portion is wound around a shaft portion.

The image formation process described above will be described in more detail focusing on the developing step. The developing roller 13*a* rotates in a direction indicated by arrow in FIG. 2. As illustrated in FIG. 3, the developer in the developing device 13 circulates in the longitudinal direction while being stirred and mixed together with the toner supplied through the toner supply inlet 13*d* (inflow port) from the toner container 70 via the toner supply path 27 by the rotation in a direction indicated by arrow of the first conveying screw 13*b*1 and the second conveying screw 13*b*2 disposed with the partition member 13*e* interposed therebetween (circulation in the direction of the dashed arrow in FIG. 3). Note that the toner supply inlet 13*d* of the developing device 13 is communicated with and released from the toner supply path 27 of the image forming apparatus body 1 in conjunction with the attachment/detachment operation of the developing device 13 (process cartridge 10BK) with respect to the image forming apparatus body 1.

Then, the toner that has been frictionally charged and attracted to the carrier is pumped up onto the developing roller 13*a* together with the carrier by an agent-pumping electrode formed on the developing roller 13*a*. The developer carried on the developing roller 13*a* is conveyed in a direction indicated by arrow in FIG. 2 and reaches a position facing the doctor blade 13*c*. Then, after the amount of the developer on the developing roller 13*a* is adjusted to an appropriate amount at this position, the developer is conveyed to a position facing the photoconductor drum 11 (a developing region). Then, the toner is attracted to the latent image formed on the photoconductor drum 11 by the electric field formed in the developing region. Subsequently, the developer remaining on the developing roller 13*a* reaches above the first conveyance path B1 as the sleeve rotates and is separated from the developing roller 13*a* at this position. Here, the electric field in the developing region is formed by a predetermined voltage (developing bias) applied to the developing roller 13*a* by a power source for developing, and a surface potential (latent image potential) formed on the surface of the photoconductor drum 11 by the charging step and the exposure step.

Note that the toner in the toner container 70 is appropriately supplied into the developing device 13 from the toner supply inlet 13*d* as the toner in the developing device 13 is consumed. The consumption of the toner in the developing device 13 is detected by a toner concentration sensor that magnetically detects a toner density of the developer (a ratio of toner in the developer) in the developing device 13. In addition, the toner supply inlet 13*d* is provided at one end portion of the second conveying screw 13*b*2 in the longitudinal direction (the horizontal direction in FIG. 3) and above the second conveying screw 13*b*2 (the second conveyance path B2).

Hereinafter, a faceplate 40 as a positioning member, which is characteristic of the process cartridge 10BK according to the present embodiment, will be described in detail with reference to FIGS. 3 to 6B and the like. As described above with reference to FIGS. 2, 3, and the like, the process cartridge 10BK is a unit detachably installed with respect to the image forming apparatus body 1. In addition, in the process cartridge 10BK, the photoconductor drum 11 (first rotating body) as a rotatable image bearer, the developing roller 13*a* (second rotating body) as a rotatable developer bearer facing the photoconductor drum 11, and the like are installed. The developing roller 13*a* (developer bearer) is rotatably held by the developing device 13. In addition, the developing device 13 is configured to be capable of accommodating the developer therein and is detachably installed with respect to the process cartridge 10BK.

Figure 4:
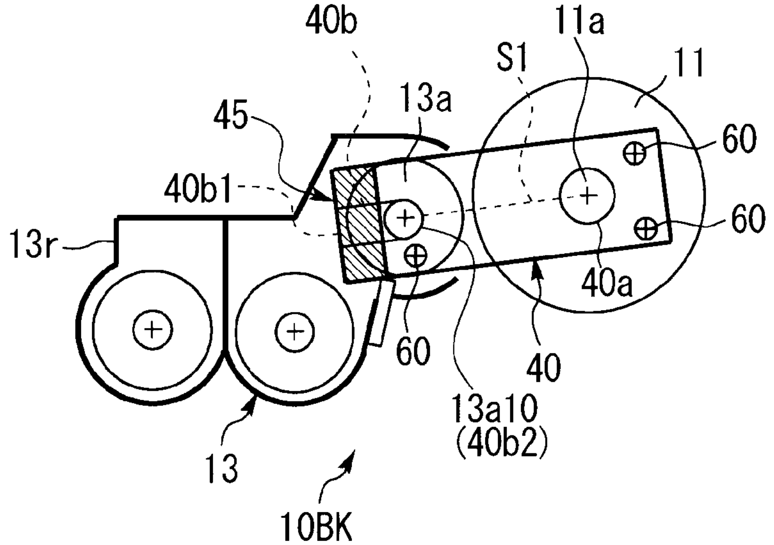
FIG. 4 is a diagram illustrating a state in which a developing device is attached to the process cartridge.

Here, referring to FIGS. 3, 4, and the like, in the process cartridge 10BK according to the present embodiment, the faceplate 40 (first faceplate) as a positioning member that defines a facing distance H (developing gap) between the photoconductor drum 11 and the developing roller 13*a* is detachably installed on one end portion in the rotation axis direction (longitudinal direction) (the left side of FIG. 3). In addition, in the process cartridge 10BK, a faceplate 41 (second faceplate) as a second positioning member that defines the facing distance H (developing gap) between the photoconductor drum 11 and the developing roller 13*a* is detachably installed on the other end portion in the rotation axis direction (the right side of FIG. 3).

As described above, in the process cartridge 10BK according to the present embodiment, the faceplates 40 and 41 are installed at both end portions in the rotation axis direction, respectively. First, the faceplate 40 (first faceplate) as the positioning member installed on one end portion in the rotation axis direction will be described. The faceplate 40 functions as the positioning member that defines the facing distance H between the photoconductor drum 11 as the first rotating body and the developing roller 13*a* as the second rotating body.

Figure 5:
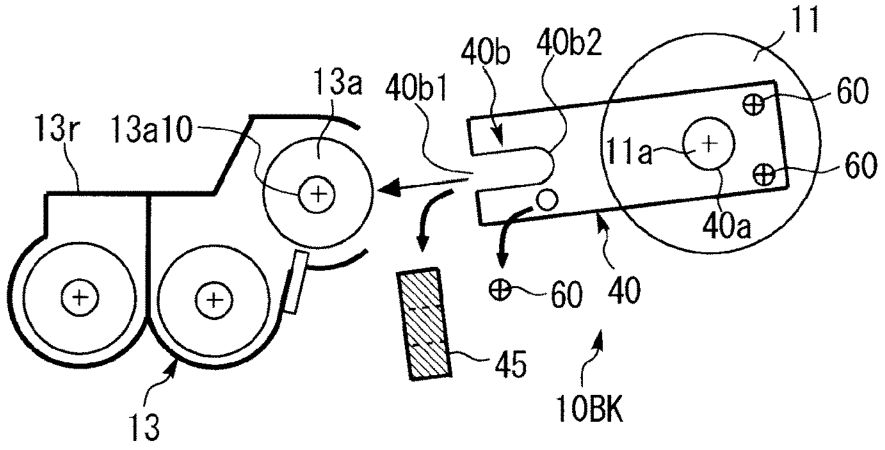
FIG. 5 is a diagram illustrating a state in which the developing device is removed from the process cartridge.

As illustrated in FIGS. 4, 5, and the like, the faceplate 40 (positioning member) is provided with a through-hole 40*a* as a fitting portion and a notch groove 40*b*. The through-hole 40*a* functions as the fitting portion to which a drum shaft 11*a* as a fitted portion of the photoconductor drum 11 (first rotating body) as the image bearer is rotatably fitted. The through-hole 40*a* is formed such that a diameter of the through-hole is substantially the same as a shaft diameter of the drum shaft 11*a*. The groove 40*b* is formed so as to extend in a predetermined direction (a direction in which imaginary line S1 of FIG. 4 extends) from an opening 40*b*1 (one end) to abutting portion 40*b*2 (the other end) and is configured so that a shaft portion 13*a*10 of the developing roller 13*a* (developer bearer) as the second rotating body is slidably movable. The groove 40*b* is formed such that the groove width substantially matches the shaft diameter of the shaft portion 13*a*10. In addition, the abutting portion 40*b*2 of the groove 40*b* has an arc-shaped surface portion having substantially the same diameter as the shaft diameter (outer diameter) of the shaft portion 13*a*10. Further, the center of the arc-shaped abutting portion 40*b*2 is formed so as to pass through an imaginary line S1 obtained by extending the center lines of the two surface portions of the groove 40*b* facing each other so that the shaft portion 13*a*10 is sandwiched in the extending direction of the groove 40*b*. Note that, in the present embodiment, the direction in which the groove 40*b* extends ("predetermined direction") is the direction in which the imaginary line S1 passing through the center of the through-hole 40*a* as the fitting portion (the center of the drum shaft 11*a*) and the center of the abutting portion 40*b*2 (the center of the shaft portion 13*a*10) extends.

Then, referring to FIGS. 4 and 5, in the faceplate 40 (positioning member) according to the present embodiment, a restricting member 45 that restricts movement in a predetermined direction (a direction in which imaginary line S1 extends) with respect to the shaft portion 13*a*10 in a state that is inserted into the groove 40*b* from the opening 40*b*1 and that abuts on the abutting portion 40*b*2 is detachably installed. Specifically, the restricting member 45 is a substantially elongated rectangular parallelepiped member made of a resin material, has a snap-fit formed at a tip portion thereof, and is detachably fitted into the groove 40*b*. Then, as illustrated in FIG. 4, the restricting member 45 is fitted into the groove 40*b*, and the position of the shaft portion 13*a*10 in the groove 40*b* is determined so that the shaft portion 13*a*10 (of the developing roller 13*a*) does not fall off from the groove 40*b*. In addition, as illustrated in FIG. 5, the restricting member 45 is taken out from the groove 40*b*, and the shaft portion 13*a*10 is brought into a slidably movable state in the groove 40*b*. Note that, in the present embodiment, restricting member 45 is provided with the snap-fit and is detachably installed on the faceplate 40. However, a method of installing the restricting member 45 is not limited to this. For example, the restricting member 45 may be detachably installed on the faceplate 40 by screw fastening.

With the faceplate 40 configured as described above, the position of the photoconductor drum 11 (drum shaft 11*a*) is determined by the through-hole 40*a*, and the position of the developing roller 13*a* (shaft portion 13*a*10) is determined by the groove 40*b*. In particular, the developing roller 13*a* is held by the restricting member 45 such that the shaft portion 13*a*10 is in close contact with the abutting portion 40*b*2. As a result, the inter-shaft distance between the photoconductor drum 11 and the developing roller 13*a* is defined, and the developing gap H (see FIG. 3) is accurately set to a target value. In particular, even if the developing roller 13*a* receives pressure (reaction force) from the developer when the developer borne on the developing roller 13*a* comes into contact with the photoconductor drum 11, the developing gap H does not change and a good developing step is performed.

Then, in the present embodiment, the groove 40*b* of faceplate 40 is provided with the opening 40*b*1 that opens obliquely downward to the left in FIG. 5 so that the shaft portion 13*a*10 can be inserted into and removed from the groove 40*b*. That is, in the groove 40*b*, in the abutting portion 40*b*2, a curved wall portion (that is made of an inner peripheral surface having substantially the same diameter as the outer peripheral surface of the shaft portion 13*a*10) on which the outer peripheral surface of the shaft portion 13*a*10 abuts is formed. On the other hand, in the groove 40*b*, the opening 40*b*1 is not provided with a wall portion on which the shaft portion 13*a*10 abuts and is opened obliquely downward with the groove width of the groove 40*b*. As a result, the shaft portion 13*a*10 can be moved in a direction indicated by arrow of FIG. 5 to be separated from the groove 40*b*, or the shaft portion 13*a*10 can be moved in the opposite direction to be inserted into the groove 40*b*. In addition, the shaft portion 13*a*10 can be moved (sliding moved) along the groove 40*b*.

By forming the groove 40*b* in the faceplate 40 in this manner, time and effort involved in maintenance and replacement of the developing roller 13*a* are reduced as compared with a case where a through-hole for positioning is formed instead of the groove 40*b*. Specifically, when maintenance or replacement of the developing roller 13*a* (of the developing device 13) is performed, the developing roller 13*a* (of the developing device 13) can be attached to and detached from the faceplate 40 in a state in which the photoconductor drum 11 is fitted without taking time and effort to release the fitting between the photoconductor drum 11 and the faceplate 40. In particular, in the present embodiment, in order to improve the detachability of the developing roller 13*a* (of the developing device 13) with respect to the process cartridge 10BK, the groove 40*b* is formed along the direction in which imaginary line S1 (imaginary line connecting the center of the drum shaft 11*a* and the center of the shaft portion 13*a*10) extends. Therefore, when a maintenance worker detaches the developing device 13, the developing device is moved in a direction away from the photoconductor drum 11, so that it is possible to suppress a defect of damaging the photoconductor drum 11 by the developing device 13. In addition, even when the worker attaches the developing device 13, attention is paid to the positional relationship between the photoconductor drum 11 and the developing device 13 by bringing the developing device 13 straight close to the photoconductor drum 11, so that the defect of damaging the photoconductor drum 11 due to carelessness is suppressed.

Here, referring to FIGS. 3 and 4, in the present embodiment, the faceplate 40 as the positioning member is detachably coupled to a developing case 13*r* of the developing device 13 and the cartridge casing 50 (in the present embodiment, screw fastening is employed), respectively. The cartridge casing 50 is the housing of a process cartridge 10BK different from the developing case 13*r* and holds the charging device 12 and the cleaning device 15 in addition to the photoconductor drum 11. In addition to the developing roller 13*a*, the developing case 13*r* holds two conveying screws 13*b*1 and 13*b*2 and the doctor blade 13*c*.

Specifically, the faceplate 40 has three screw through-holes into which a screw 60 can be inserted. In addition, one female screw portion is formed on a side surface of the developing case 13*r*, and two female screw portions are formed on a side surface of the cartridge casing 50. Then, the screw 60 is screwed into one female screw portion of the developing case 13*r* through the screw through-hole of the faceplate 40, and the screw 60 is screwed into each of the two female screw portions of the cartridge casing 50. As a result, as illustrated in FIGS. 3, 4, and the like, in the process cartridge 10BK, the developing device 13 is joined via the faceplate 40 and integrated as one unit. Further, the inter-shaft distance between the photoconductor drum 11 and the developing roller 13*a* is defined by the faceplate 40, and the developing gap H (see FIG. 3) is accurately set to a target value.

Here, in a state in which the coupling of the faceplate 40 to the developing case 13*r* is released (in a state in which one screw 60 is removed), by moving the shaft portion 13*a*10 of the developing roller 13*a* between the opening 40*b*1 and the abutting portion 40*b*2, the developing device 13 is configured so as to be detachable along with the developing roller 13*a* with respect to the faceplate 40 in a state coupled to the cartridge casing 50 (in a state in which two screws 60 are screwed).

Specifically, as illustrated in FIG. 4, in order to perform maintenance, replacement, or the like of the developing device 13, when the developing device 13 is detached from the process cartridge 10BK to which the developing device 13 is coupled by the screw 60 via the faceplate 40, the process cartridge 10BK is first taken out from the image forming apparatus body 1. Then, as illustrated in FIG. 5, in the taken-out process cartridge 10BK, the screw 60 (one each is installed on each of the two faceplates 40 and 41 at both ends) that couples the developing device 13 is removed. At this time, the photoconductor drum 11 remains coupled to the cartridge casing 50 by the faceplate 40 with the screws 60. In addition, as illustrated in FIG. 5, the restricting member 45 is removed from faceplate 40. Then, as illustrated in FIG. 5, the developing device 13 in a state where the screw fastening with the faceplate 40 (the restricting member 45 is removed) is released is moved obliquely downward along the groove 40*b* of the faceplate 40, and the developing device 13 is removed from the process cartridge 10BK. Specifically, the shaft portion 13*a*10 of the developing roller 13*a* is moved obliquely downward along the groove 40*b*, and the developing device 13 is removed from the process cartridge 10BK. At this time, in the process cartridge 10BK, components other than the developing device 13 (the photoconductor drum 11, the charging device 12, and the cleaning device 15) remain held in the cartridge casing 50. Note that, when the developing device 13 is attached to the process cartridge 10BK, the operation is performed in a procedure reverse to that at the time of detachment described above.

As described above, by forming the groove 40*b* in the faceplate 40, time and effort involved in maintenance and replacement of the developing device 13 are reduced as compared with a case where a through-hole for positioning is formed instead of the groove 40*b*. Specifically, when maintenance or replacement of the developing device 13 is performed, the developing device 13 can be attached to and detached from the faceplate 40 without taking time and effort to release the fitting between the photoconductor drum 11 and the faceplate 40 with respect to the faceplate 40 in the state where the photoconductor drum 11 is fitted.

Note that, referring to FIG. 3, one faceplate 40 (the first faceplate on the left side of FIG. 3) of the two faceplates 40 and 41 is for holding a shaft portion 13*a*10 that does not rotate (a shaft portion for determining the posture of the magnet 13*al* in the rotation direction) of the developing roller 13*a*. On the other hand, the other faceplate 41 (the second faceplate on the right side of FIG. 3) is for holding a shaft portion 13*a*20 being rotatable (a shaft portion for rotating the sleeve 13*a*2) of the developing roller 13*a*.

In the present embodiment, the faceplate 41 as the second faceplate is not provided with the groove 40*b* similarly to the faceplate 40 (positioning member) as the first faceplate but is configured as a second positioning member without the groove 40*b*. Specifically, referring to FIGS. 3, and 6A and 6B, the faceplate 41 (second faceplate) as the second positioning member has a through-hole 41*a* as a fitting portion and a positioning through-hole 41*b*. Similar to one in the first faceplate 40, the drum shaft 11*a* (fitted portion) of the photoconductor drum 11 is rotatably fitted in the through-hole 41*a* as the fitting portion. On the other hand, in the positioning through-hole 41*b*, the shaft portion 13*a*20 of the developing roller 13*a* (developer bearer) is fitted through the bearing 65 (a ball bearing in the present embodiment) that is attachable and detachable. That is, in the second faceplate 41, the positioning through-hole 41*b* is formed instead of the groove 40*b* of the first faceplate 40.

Figure 6A:
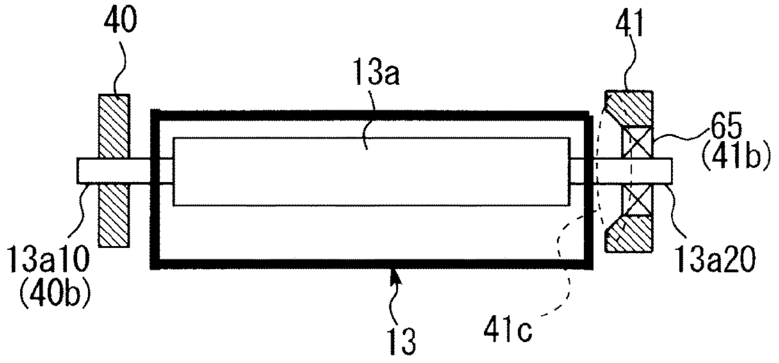
FIG. 6A is a schematic view illustrating a state in which the developing device is attached to a faceplate of the process cartridge.
Figure 6B:
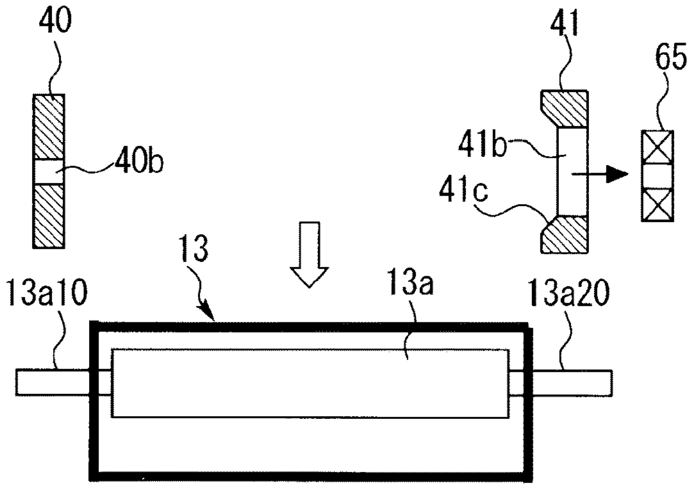
FIG. 6B is a schematic view illustrating a state in which the developing device is removed from the faceplate of the process cartridge.

With such a configuration, as illustrated in FIGS. 6A and 6B, by removing the bearing 65 mounted on the second faceplate 41 in a direction indicated by arrow, a large gap is formed between the shaft portion 13*a*20 on the other end portion of the developing roller 13*a* and the positioning through-hole 41*b*, the positioning of the developing device 13 by the second faceplate 41 is released, and the developing device 13 can be moved to some extent vertically and horizontally. Therefore, as described above with reference to FIG. 5, when the developing device 13 is removed from the process cartridge 10BK while moving the developing roller 13*a* along the groove 40*b* of the first faceplate 40, the screw fastening between the second faceplate 41 and the developing device 13 is released and the bearing 65 is removed, so that the second faceplate 41 can be kept attached to the process cartridge 10BK. Specifically, while moving the developing device 13 in the rotation axis direction or obliquely downward in a state where the bearing 65 is detached, the developing device 13 is removed from the process cartridge 10BK while moving the developing roller 13*a* along the groove 40*b* of the first faceplate 40. By forming the second faceplate 41 in this manner, time and effort involved in maintenance and replacement of the developing device 13 are reduced. Specifically, when maintenance or replacement of the developing device 13 is performed, the developing device 13 can be attached to and detached from the two faceplates 40 and 41 without taking time and effort to release fitting between the photoconductor drum 11 and the two faceplates 40 and 41 with respect to the two faceplates 40 and 41 in a state where the photoconductor drum 11 is fitted.

Note that, in the present embodiment, as illustrated in FIGS. 6A and 6B, the second faceplate 41 (second positioning member) is provided with a cone-shaped through-hole 41*c* (tapered portion) having a hole diameter gradually increasing from the positioning through-hole 41*b* toward the one end portion in the rotation axis direction (the left side of FIG. 6). As a result, the movable range of the developing roller 13*a* (the shaft portion 13*a*20) when the bearing 65 is detached from the second faceplate 41 is further expanded, and thus, it is easy to attach and detach the developing device 13 while keeping the faceplates 40 and 41 described above attached to the process cartridge 10BK.

First Modification

Figure 7A:
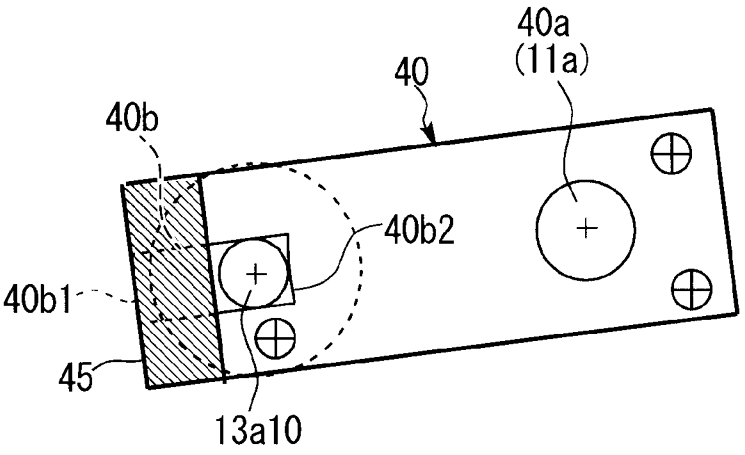
FIGS. 7A and 7B are enlarged views of a positioning member in a process cartridge according to a first modification of the embodiment illustrated in FIG. 3.
Figure 7B:
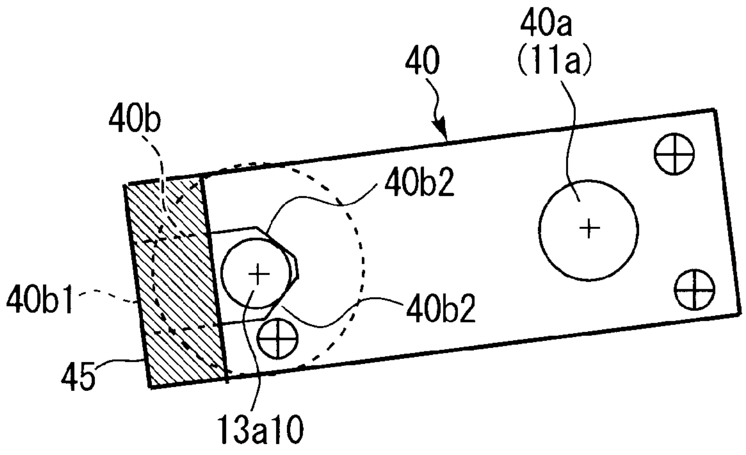

As illustrated in FIGS. 7A and 7B, in a faceplate 40 (first faceplate) as a positioning member in a first modification of the embodiment illustrated in FIG. 3, a shape of an abutting portion 40*b*2 of a groove 40*b* is different from that illustrated in FIGS. 4 and 5. Specifically, in the faceplate 40 illustrated in FIG. 7A, the abutting portion 40*b*2 of the groove 40*b* includes a face portion formed in an arc shape around the rotation center of the through-hole 40*a* (fitting portion). That is, the abutting portion 40*b*2 is formed in a convex curved surface shape on the opening 40*b*1 side. With such a configuration, even in a case where there is a gap (backlash) between the groove 40*b* (two surface portions facing each other with the shaft portion 13*a*10 interposed therebetween) and the shaft portion 13*a*10 and the position of the shaft portion 13*a*10 abutting on the abutting portion 40*b*2 is not fixed, the inter-shaft distance between the drum shaft 11*a* (of the photoconductor drum 11) and the shaft portion 13*a*10 (of the developing roller 13*a*) does not vary, and the developing gap H (see FIG. 3) is accurately set to a target value. In addition, in the faceplate 40 illustrated in FIG. 7B, the abutting portion 40*b*2 of the groove 40*b* includes two face portions in which the facing distance therebetween gradually decreases toward the through-hole 40*a* (fitting portion). That is, the abutting portion 40*b*2 is formed in a shape of "<" (a less-than sign) substantially in a concave shape on the opening 40*b*1 side. With such a configuration, even in a case where a gap (backlash) is provided between the groove 40*b* (two surface portions facing each other with the shaft portion 13*a*10 interposed therebetween) and the shaft portion 13*a*10, the shaft portion 13*a*10 can abut on the abutting portion 40*b*2 to determine the position. Therefore, the inter-shaft distance between the photoconductor drum 11 and the developing roller 13*a* is defined, and the developing gap H (see FIG. 3) is accurately set to a target value.

Second Modification

Figure 8:
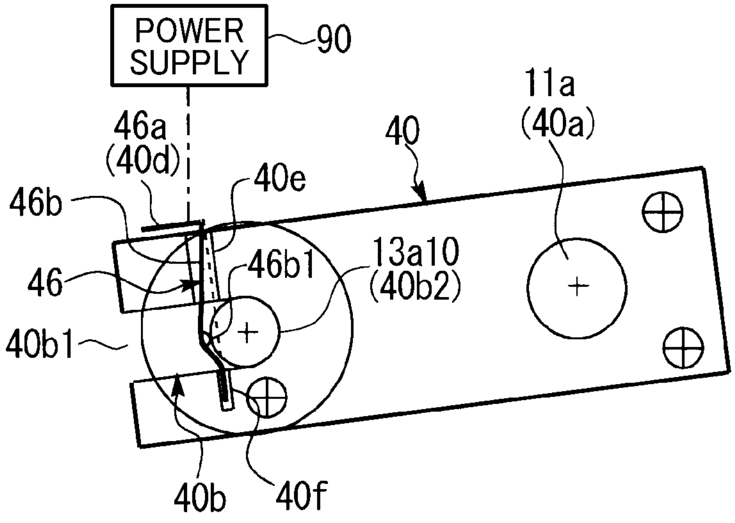
FIG. 8 is an enlarged view of a positioning member in a process cartridge according to a second modification of the embodiment illustrated in FIG. 3.
Figure 9A:
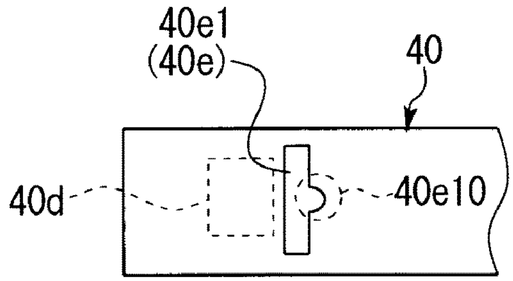
Figure 9B:
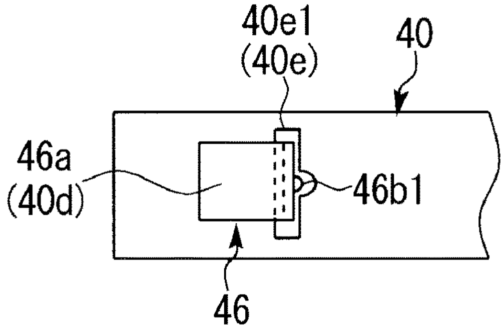

As illustrated in FIG. 8, in the faceplate 40 in a second modification of the embodiment illustrated in FIG. 3, a leaf spring 46 as an elastic member that biases the shaft portion 13*a*10 toward the drum shaft 11*a* (fitted portion) is used as a restricting member that restricts the movement of the shaft portion 13*a*10 in the groove 40*b*. The leaf spring 46 (restricting member) as the elastic member is a metal plate formed in a substantially L shape and having conductivity and spring property. On the other hand, with reference to FIGS. 8, and 9A and 9B, an insertion through-hole 40*e*, a fixing portion 40*f*, a planar portion 40*d*, and the like are formed in the faceplate 40. The insertion through-hole 40*e* is a through-hole where a pressing portion 46*b* (a portion excluding a bent portion 46*a*) of the leaf spring 46 is inserted so as to be elastically deformable and intersects and communicates with the groove 40*b*. The fixing portion 40*f* is a portion into which a tip portion of the pressing portion 46*b* of the leaf spring 46 having passed through the groove 40*b* is inserted and fixed. The planar portion 40*d* is a portion on which the bent portion 46*a* of the leaf spring 46 abuts in a surface-contactable manner. In a case where the shaft portion 13*a*10 does not exist in the abutting portion 40*b*2 (a state in which it is not elastically deformed), as indicated by a broken line in FIG. 8, the leaf spring 46 enters a range where the shaft portion 13*a*10 is scheduled to be installed (within a range of an outer diameter of the shaft portion 13*a*10). Then, in a state where the shaft portion 13*a*10 is installed on the abutting portion 40*b*2, the leaf spring 46 is elastically deformed as indicated by a solid line in FIG. 5, and the shaft portion 13*a*10 (of the developing roller 13*a*) is biased toward the photoconductor drum 11. As a result, the shaft portion 13*a*10 abuts on the abutting portion 40*b*2 in close contact, the inter-shaft distance between the photoconductor drum 11 and the developing roller 13*a* is defined, and the developing gap H (see FIG. 3) is accurately set to a target value. In particular, in the leaf spring 46 of the second modification, the bent portion 46*a* is fixed by the planar portion 40*d*, and the tip portion of the pressing portion 46*b* is detachably inserted into the fixing portion 40*f*, so that the biasing force of the pressing portion 46*b* with respect to the shaft portion 13*a*10 is easily secured. Therefore, the effect caused by the above-described shaft portion 13*a*10 abutting so as to stick to the abutting portion 40*b*2 is easily exhibited.

Here, referring to FIG. 8, the process cartridge 10BK in the second modification is configured to apply a developing bias to the shaft portion 13*a*10 of the developing roller 13*a* via the leaf spring 46 (restricting member) of the faceplate 40 (positioning member). Specifically, the leaf spring 46 is configured to be electrically connected to and disconnected from the power supply 90 installed in the image forming apparatus body 1 in conjunction with the operation in which the developing device 13 (process cartridge 10BK) on which the faceplate 40 is installed is attached to and detached from the image forming apparatus body 1. Then, in a state where the developing device 13 (process cartridge 10BK) is attached to the image forming apparatus body 1, in a normal image forming process, as described above with reference to FIG. 2, a predetermined developing bias is applied from the power supply 90 to the developing roller 13*a* via the leaf spring 46, and the developing step is performed. By causing the leaf spring 46 to also function as an electrode for applying the developing bias in this manner, the device is reduced in size and cost as compared with a case where such an electrode is installed exclusively. Note that, as illustrated in FIG. 8, in the leaf spring 46 of the second modification, a convex portion 46*b*1 capable of making point contact with the shaft portion 13*a*10 located at the abutting portion 40*b*2 is formed in the pressing portion 46*b*. In this way, by configuring the pressing portion 46*b* (convex portion 46*b*1) to be in point contact with the shaft portion 13*a*10, the contact state of the pressing portion 46*b* with respect to the shaft portion 13*a*10 is easily stabilized as compared with a case where the pressing portion 46*b* is configured to be in surface contact with the shaft portion 13*a*10, and thus the application of the developing bias to the developing roller 13*a* is also stabilized. In addition, while the shaft portion 13*a*10 in the second modification does not rotate as described above, in a case where the shaft portion 13*a*10 is configured to rotate, by configuring the pressing portion 46*b* (convex portion 46*b*1) to be in point contact with the shaft portion 13*a*10, sliding friction of the pressing portion 46*b* due to sliding contact with the shaft portion 13*a*10 can be reduced as compared with a case where the pressing portion 46*b* is configured to be in surface contact with the shaft portion 13*a*10. Note that, with reference to FIGS. 9A and 9B, a convex shaped portion 40*e*10 formed in an insertion port 40*el* of the faceplate 40 (an opening for inserting the pressing portion 46*b* of the leaf spring 46 into the insertion through-hole 40*e*) is for preventing the convex portion 46*b*1 from interfering when the leaf spring 46 is attached to the faceplate 40.

As described above, the faceplate 40 in the present embodiment is the positioning member that defines the facing distance H between the photoconductor drum 11 (first rotating body) and the developing roller 13*a* (second rotating body), and includes the through-hole 40*a* (fitting portion) into which the drum shaft 11*a* (fitted portion) of the photoconductor drum 11 is rotatably fitted, and the groove 40*b* that is formed in a groove shape so as to extend in a predetermined direction from the opening 40*b*1 to the abutting portion 40*b*2 and in which the shaft portion 13*a*10 of the developing roller 13*a* is slidably movable. Then, the restricting member 45 that restricts movement in the predetermined direction is detachably installed with respect to the shaft portion 13*a*10 in a state of abutting on the abutting portion 40*b*2 in the groove 40*b*. As a result, time and effort related to maintenance and replacement are reduced.

In the present embodiment, the through-hole 40*a* as the fitting portion of the faceplate 40 (positioning member) is configured to be fitted to the drum shaft 11*a* as the fitted portion of the photoconductor drum 11 (image bearer). However, the combination of the fitted portion of the image bearer and the fitting portion of the positioning member is not limited thereto, and for example, a convex member as a fitting portion of the faceplate 40 (positioning member) may be configured to be fitted to a concave flange as the fitted portion of the photoconductor drum 11 (image bearer). In the present embodiment, the through-hole 40*a* and the groove 40*b* of the faceplate 40 are formed such that the drum shaft 11*a* and shaft portions 13*a*10 and 13*a*20 pass through the through-hole 40*a* and the groove 40*b*, respectively. On the other hand, at least one of the through-hole 40*a* and the groove 40*b* of the faceplate 40 can be formed such that the drum shaft 11*a* and the shaft portions 13*a*10 and 13*a*20 do not penetrate and the outside in the rotation axis direction is closed. In addition, in the present embodiment, the groove 40*b* is formed along the direction in which imaginary line S1 (imaginary line connecting the center of the drum shaft 11*a* and the center of shaft portion 13*a*10) extends, but the direction in which the groove 40*b* extends is not limited thereto. Further, in the present embodiment, the groove 40*b* is formed so as to extend in the oblique direction, but the direction in which the groove 40*b* extends is not limited thereto, and it is just required that the opening 40*b*1 is not arranged so as to face the photoconductor drum 11, and for example, the groove 40*b* may be formed so as to extend in the horizontal direction. Such cases also provide substantially the same effects as the effects described above.

In the present embodiment, the present invention is applied only to the faceplate 40 (first faceplate) installed on one end portion of the process cartridge 10BK, and the present invention (the groove 40*b* and the restricting member 45) is not applied to the faceplate 41 (second faceplate) installed on the other end portion. However, it is sufficient that the positioning member (faceplate 40) according to the present invention is detachably installed at least on one end portion in the rotation axis direction, and the present invention (the groove 40*b* and the restricting member 45) can also be applied to the faceplate installed on the other end portion. In this case, the positioning members (faceplates 40) of the present invention installed at both end portions each in the rotation axis direction are symmetrical with each other with respect to the rotation axis direction. In the present embodiment, the present invention is applied to the positioning member (faceplate 40) that defines the facing distance H between the photoconductor drum 11 as the first rotating body and the developing roller 13*a* as the second rotating body. However, the application of the present invention is not limited thereto, and the present invention can be applied to all of the positioning members as long as the positioning member defines the facing distance between the first rotating body and the second rotating body. Such cases also provide substantially the same effects as the effects described above.

Further, in the present embodiment, the present invention is applied to the process cartridge 10BK including the photoconductor drum 11 (image bearer), the developing device 13, the charging device 12, and the cleaning device 15, but the process cartridge to which the present invention is applied is not limited thereto, and the present invention can be applied to the one as long as including at least the photoconductor drum (image bearer) and the developing device (developer bearer). Such a case also provides substantially the same effects as the effects described above. Note that, in the present application, "a process cartridge" is defined as a unit in which at least one of a charging device that charges an image bearer, a developing device that develops a latent image formed on the image bearer, and a cleaning device that cleans the image bearer, and the image bearer are integrated and that is configured to be attached to and detached from an image forming apparatus body.

Note that the positioning of the shaft portion of the developing roller 13*a* described above is the positioning of the developing roller 13*a* in the process cartridge 10BK and, so to say, corresponds to a main reference of the developing device 13. On the other hand, a sub-reference (positioning with respect to the rotation direction of the developing roller 13*a*) can be formed on at least one of one end portion and the other end portion of the cartridge casing 50 or the faceplates 40 and 41. When the main reference of the faceplates 40 and 41 is formed of the groove, the sub-reference is desirably formed of the groove similarly to the faceplates 40 and 41. In particular, by forming the sub-reference groove in parallel with the groove of the faceplate, it is possible to significantly reduce the risk of damaging the photoconductor drum 11 when the developing device 13 is attached or detached. On the other hand, by providing a portion inclined with respect to the grooves of the faceplates 40 and 41 in at least a part of the sub-reference grooves, a portion where the developing device 13 does not come off smoothly is intentionally provided, and the developing device 13 can be configured to be unlikely to fall off the process cartridge 10BK when the restricting member is removed. Particularly desirably, in a predetermined range of the sub-reference groove on the photoconductor drum side (the backside in the attaching and detaching direction of the developing device 13), the sub-reference groove is formed so as to be parallel to the groove of the faceplates 40 and 41, and an inclined portion can be provided on a part of the side away from the photoconductor drum 11 (the front side in the attaching and detaching direction of the developing device 13). As a result, while separating the developing device 13 from the photoconductor drum 11 without damaging the photoconductor drum 11, it is possible to prevent the developing device 13 from falling off the process cartridge 10BK.

Hereinafter, a characteristic configuration and operation of the process cartridge 10BK as the holding device in the present embodiment will be described in detail with reference to FIGS. 10 to 13 and the like. As described above with reference to FIGS. 2, 3, and the like, the process cartridge 10BK is a unit detachably installed with respect to the image forming apparatus body 1. In the process cartridge 10BK, the photoconductor drum 11 (first rotating body) as the rotatable image bearer, the developing roller 13*a* (second rotating body) as the rotatable developer bearer facing the photoconductor drum 11, and the like are installed. That is, the process cartridge 10BK functions as the holding device that rotatably holds the photoconductor drum 11 as the first rotating body and the developing roller 13*a* as the second rotating body.

Note that the photoconductor drum 11 as the first rotating body is rotatably supported by the cartridge casing 50 as the housing. Specifically, a through-hole is formed in the cartridge casing 50, and the through-hole functions as the fitting portion to which the drum shaft 11*a* as the fitted portion of the photoconductor drum 11 (first rotating body) as the image bearer is rotatably fitted. On the other hand, the developing roller 13*a* (developer bearer) as the second rotating body is rotatably held by the developing device 13. In addition, the developing device 13 is configured to be capable of accommodating the developer therein and is detachably installed with respect to the process cartridge 10BK.

Figure 10:
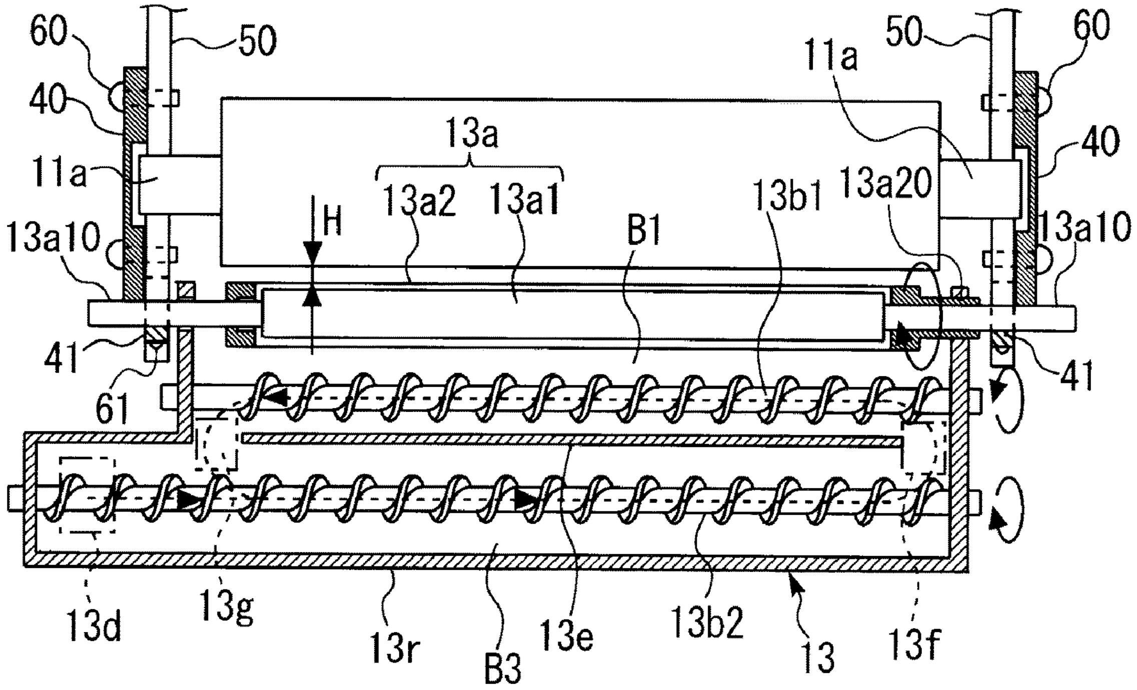
FIG. 10 is a cross-sectional view illustrating a main part of a process cartridge according to another embodiment of the present invention, cut along a longitudinal direction of the process cartridge.
Figure 11:
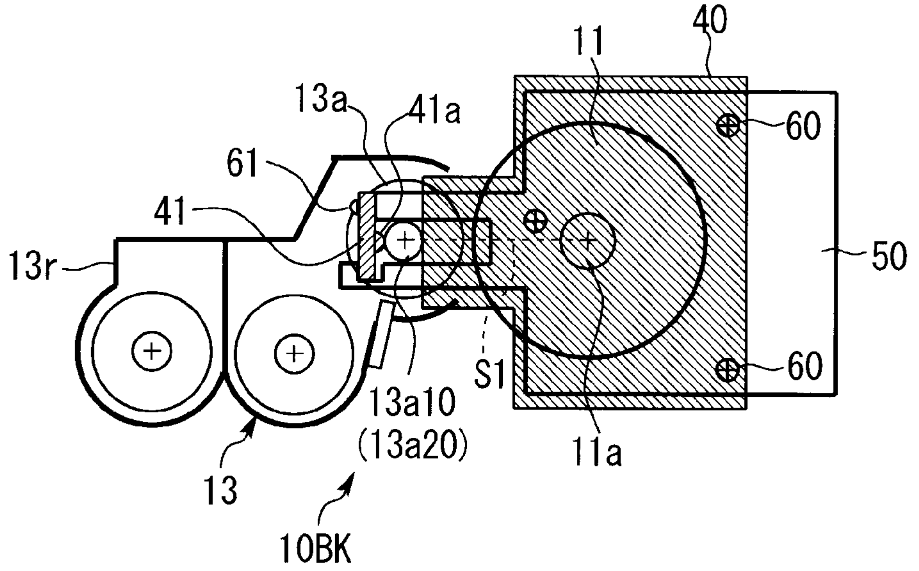
FIG. 11 is a diagram illustrating a state in which a developing device is attached to the process cartridge.

Here, referring to FIGS. 10, 11, and the like, in the process cartridge 10BK according to the present embodiment, the faceplate 40 as the positioning member that abuts on the shaft portion 13*a*10 of the developing roller 13*a* (a shaft portion of the non-rotating magnet 13*al*) and defines the facing distance H (developing gap) between the photoconductor drum 11 and the developing roller 13*a* is detachably installed on both ends in the rotation axis direction (longitudinal direction) with respect to the cartridge casing 50 (housing), respectively. These two faceplates 40 are configured substantially similar except that they are formed symmetrically to each other. Such a relationship between the two faceplates 40 installed at both end portions in the rotation axis direction is similar for the restricting member 41 and two wall portions 50*a* and 50*b* (restricting portions) to be described later.

Figure 12:
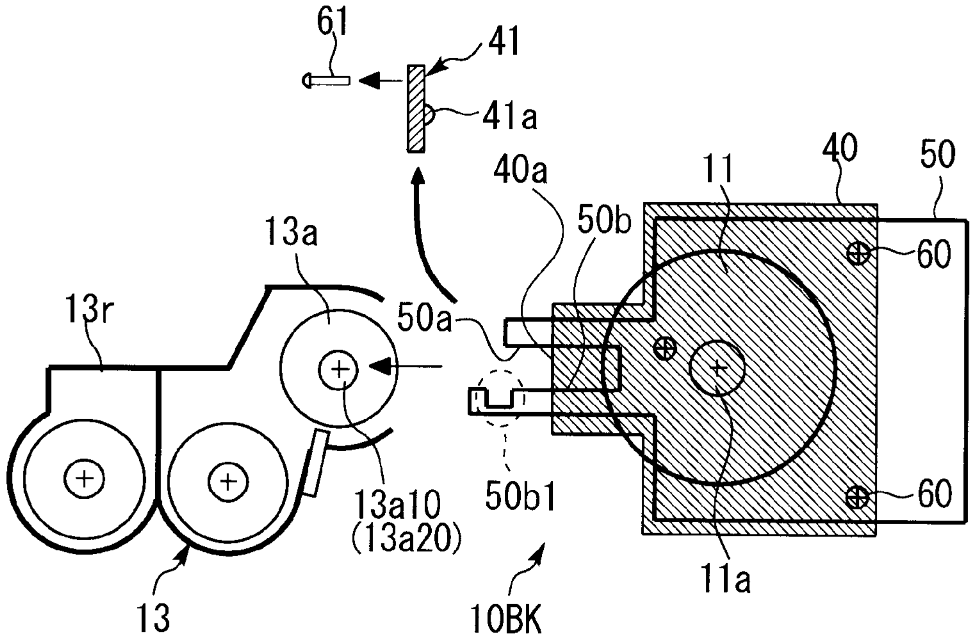
FIG. 12 is a diagram illustrating a state in which the developing device is removed from the process cartridge.
Figure 13:
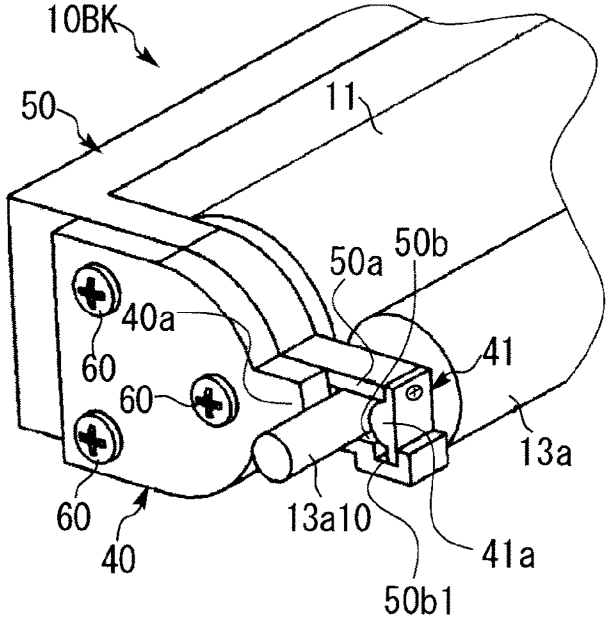
FIG. 13 is a perspective view illustrating a main part of the process cartridge.

As illustrated in FIGS. 11 to 13, the faceplate 40 (positioning member) is formed such that an abutting portion 40*a*, on which the shaft portion 13*a*10 (13*a*20) abuts, protrudes to the shaft portion 13*a*10 (13*a*20) side (the left side of FIG. 11). Note that, in the present embodiment, the faceplate 40 is detachably installed in the cartridge casing 50 by screw fastening with a plurality of screws 60. The hole diameter of the through-hole for the screw hole in the faceplate 40 is set larger than the screw diameter of the screw 60. As a result, the developing gap H can be finely adjusted by adjusting the relative position of the faceplate 40 with respect to the cartridge casing 50. Note that, in FIGS. 11 to 13 and the like, the shaft portion is denoted by a reference sign "shaft portion 13*a*10 (13*a*20)". As will be described next with reference to FIG. 14, this is a description in consideration of a configuration in which the rotatable shaft portion 13*a*20 can be positioned by the faceplate 40 in addition to the non-rotatable shaft portion 13*a*10 as another embodiment of the present embodiment.

Figure 14:
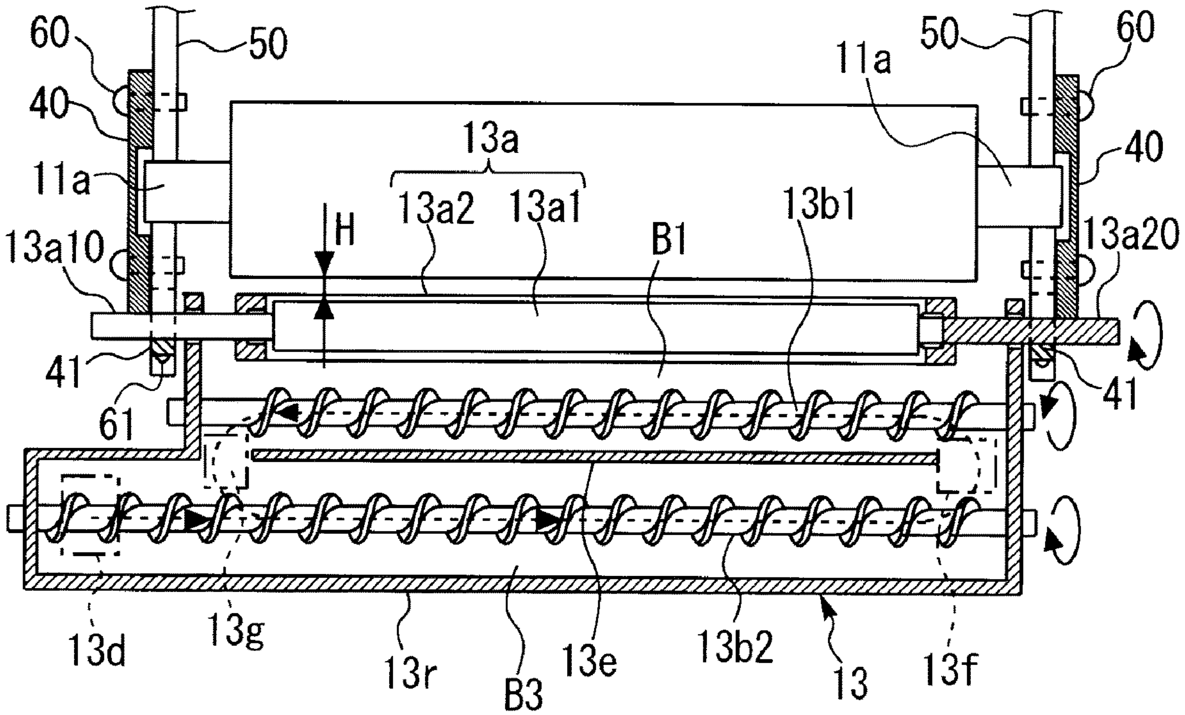
FIG. 14 is a cross-sectional view illustrating a main part of a process cartridge according to still another embodiment of the present embodiment in a longitudinal direction.

Note that, in the present embodiment, the two faceplates 40 installed at both end portions in the rotation axis direction are both configured such that the shaft portion of the non-rotating magnet 13*al* abuts. On the other hand, as illustrated in FIG. 14, the non-rotating shaft portion 13*a*10 and the rotatable shaft portion 13*a*20 of the developing roller 13*a* can be configured to be held by the two faceplates 40 respectively. In such a case, one faceplate 40 (a faceplate on the left side of FIG. 14) of the two faceplates 40 is configured such that the shaft portion 13*a*10 that does not rotate (the shaft portion for determining the posture of the magnet 13*al* in the rotation direction) of the developing roller 13*a* abuts on, and the other faceplate 40 (a faceplate on the right side of FIG. 14) is configured such that the shaft portion 13*a*20 that is rotatable (the shaft portion for rotating the sleeve 13*a*2) of the developing roller 13*a* abuts on. However, in such a case, the bearing portion (faceplate) that receives the rotatable shaft portion 13*a*20 of the developing roller 13*a* is not required to be one having a characteristic configuration as the faceplate 40 in the present embodiment (provided with the restricting member 41 and the like described later), and a known faceplate provided with a ball bearing for rotatably holding the shaft portion 13*a*20 can be used. Even in a case where the characteristic faceplate 40 (provided with the restricting member 41 and the like described later) in this embodiment is used only on one end portion in the rotation axis direction in such a manner, the effect of the present invention to be described later is exhibited. Specifically, after releasing the fixation of the developing device 13 by the faceplate 40 on one end portion in the rotation axis direction, the shaft portion 13*a*20 inserted into the ball bearing of the developing device 13 can be removed in a pulling out manner by inclining the developing device 13 with respect to the drum axis. This is because even if a known faceplate including the ball bearing described above is installed on the other end portion in the rotation axis direction, the developing device 13 can be slightly inclined by the warp of the faceplate and the cartridge casing 50 and the backlash of the ball bearing. However, in such a case, the faceplate 40 on one end portion in the rotation axis direction (provided with a restricting member 41 to be described later and the like) is preferably formed to have a smaller outer shape than the known faceplate having the ball bearing described above. With such a configuration, it is possible to reduce the inclination amount required for removing the developing device 13 from the cartridge casing 50. Therefore, defects such as damage and plastic deformation of the faceplate on the other end portion in the rotation axis direction and the cartridge casing 50 are also reduced.

Here, as illustrated in FIGS. 11 to 13, in the process cartridge 10BK (holding device) according to the present embodiment, the restricting member 41 is detachably installed in the cartridge casing 50 (housing). The restricting member 41 is a member that restricts movement of the shaft portion 13*a*10 (13*a*20) in a state of abutting on the faceplate 40 (positioning member) to move in a predetermined direction away from the faceplate 40 (movement to the left in FIG. 11). That is, the shaft portion 13*a*10 (13*a*20) is biased by the restricting member 41 so as to abut on the faceplate 40 (movement in the separation direction is restricted), and the inter-shaft distance with the photoconductor drum 11 positioned in the cartridge casing 50 is defined.

Here, as illustrated in FIG. 11, in the restricting member 41 in the present embodiment, a substantially hemispherical contact part 41*a* so as to protrude toward the shaft portion 13*a*10 (13*a*20). In particular, in the process cartridge 10BK of another embodiment described above with reference to FIG. 14, the shaft portion 13*a*10 on one end portion does not rotate, but the shaft portion 13*a*20 on the other end portion rotates, so that it is possible to reduce the sliding friction of the restricting member 41 due to the sliding contact with the shaft portion 13*a*20 by the point contact by the contact part 41*a*. In addition, in the process cartridge 10BK according to another embodiment of FIG. 14, by making the restricting member 41 of a material that is more easily worn than the faceplate 40, a difference is generated in the progress of wear, and wear of the faceplate 40 can be reduced. Therefore, it is possible to suppress fluctuation of the developing gap H due to wear of the faceplate 40. Furthermore, in order to further reduce the sliding friction of the restricting member 41, the material of the restricting member 41 may be a sliding type resin or a lubricant such as grease may be applied to the contact portion between the restricting member 41 and the shaft portion 13*a*20.

Here, as illustrated in FIGS. 11 to 13, in the cartridge casing 50 as the housing, two wall portions 50*a* and 50*b* are provided as restricting portions that restrict movement of the shaft portion 13*a*10 (13*a*20) in a direction intersecting a predetermined direction restricted by the faceplate 40 (positioning member) and the restricting member 41 (a direction intersecting the horizontal direction). The two wall portions 50*a* and 50*b* (restricting portions) face each other so that the shaft portion 13*a*10 (13*a*20) is sandwiched and are formed in a beak shape (cutout shape) at the tip portion of the cartridge casing 50. The facing distance between the two wall portions 50*a* and 50*b* is set to coincide with (or to be slightly larger then) the shaft diameter of the shaft portion 13*a*10 (13*a*20). Therefore, the shaft portion 13*a*10 (13*a*20) is positioned by being restricted from moving up, down, left, and right by the restricting member 41, the faceplate 40, and the two wall portions 50*a* and 50*b*. In addition, as illustrated in FIG. 12, in a state where the restricting member 41 is removed, the shaft portion 13*a*10 (13*a*20) is slidably movable along the two wall portions 50*a* and 50*b*.

More specifically, the two wall portions 50*a* and 50*b* (restricting portions) are formed each so as to protrude in a direction away from the photoconductor drum 11 (first rotating body) with respect to the cartridge casing 50 (housing) (the left side of FIG. 12). In addition, the two wall portions 50*a* and 50*b* have a root portion (a portion connected to the main body of the cartridge casing 50, which is a bottom portion of the notch) positioned at a position closer to the photoconductor drum 11 (first rotating body) than the abutting portion 40*a* where the faceplate 40 abuts on the shaft portion 13*a*10 (13*a*20). That is, the root portion of the two wall portions 50*a* and 50*b* is positioned on the right side than the abutting portion 40*a* in FIG. 12. With such a configuration, the shaft portion 13*a*10 (13*a*20) does not abut on the root portion of the two wall portions 50*a* and 50*b*, but abuts on the abutting portion 40*a* of the faceplate 40. Therefore, the facing distance H (developing gap) between the developing roller 13*a* and the photoconductor drum 11 is accurately set by the faceplate 40.

In addition, referring to FIGS. 11 to 13, in the present embodiment, in the restricting member 41, one end portion (an upper portion) is held by one wall portion 50*a* of the two wall portions 50*a* and 50*b* and the other end portion (a lower portion) fits into the recess 50*b*1 formed in the other wall portion 50*b* to restrict movement in a direction away from the photoconductor drum 11 (first rotating body) (the left side of FIG. 11). Specifically, a screw through-hole is formed in an upper portion of the restricting member 41. In the upper wall portion 50*a*, a female screw portion is formed at a position facing the screw through-hole of the restricting member 41. In the lower wall portion 50*b*, the recess 50*b*1 (whose opening width in the left-right direction in FIG. 12 is set to be larger than the thickness of the restricting member 41) is formed to open upward. Then, in a state where the lower portion of the restricting member 41 is fitted into the recess 50*b*1, a screw 61 is screwed into the female screw portion of the upper wall portion 50*a* via the through-hole for the screw hole of the restricting member 41. As a result, the restricting member 41 is fixed (positioned) to the cartridge casing 50, and the function of the restricting member 41 that restricts the movement of the shaft portion 13*a*10 (13*a*20) in the separation direction is efficiently achieved. When the restricting member 41 is removed from the cartridge casing 50, the work can be easily performed by releasing the screwing of one screw 61. Note that, in the present embodiment, the restricting member 41 is detachably installed on the faceplate 40 by screw fastening. However, a method of installing the restricting member 41 is not limited to this. For example, the restricting member 41 may be detachably installed on the faceplate 40 by using snap-fit.

Here, the interval between the contact part 41*a* and the abutting portion 40*a* is preferably set to be slightly narrower than the diameter of the shaft portion 13*a*10 (13*a*20). With such a configuration, the shaft portion 13*a*10 (13*a*20) is biased against the abutting portion 40*a* of the faceplate 40 by the restricting member 41, and the position of the shaft portion 13*a*10 (13*a*20) with respect to the faceplate 40 (abutting portion 40*a*) is easily determined. Note that an elastic member may be attached to the contact part 41*a*, and the shaft portion 13*a*10 (13*a*20) may be biased against the abutting portion 40*a* of the faceplate 40 by the elastic force of the elastic member. Even in such a case, the position of the shaft portion 13*a*10 (13*a*20) with respect to the faceplate 40 (abutting portion 40*a*) can be easily determined.

In the process cartridge 10BK (holding device) configured as described above, the position of the developing roller 13*a* (shaft portion 13*a*10, 13*a*20) with respect to the photoconductor drum 11 (drum shaft 11*a*) is determined by the faceplate 40. In particular, the developing roller 13*a* is held by the restricting member 41 such that the shaft portion 13*a*10 (13*a*20) is in close contact with the faceplate 40 (abutting portion 40*a*). Furthermore, the developing roller 13*a* is restricted such that the shaft portion 13*a*10 (13*a*20) is interposed between the two wall portions 50*a* and 50*b*, whereby the posture (tilt and angle) with respect to the photoconductor drum 11 is also accurately set. As a result, the inter-shaft distance and the positional relationship between the photoconductor drum 11 and the developing roller 13*a* are defined, and the developing gap H (see FIG. 10) is accurately set to a target value. In particular, even if the developing roller 13*a* receives pressure (reaction force) from the developer when the developer borne on the developing roller 13*a* comes into contact with the photoconductor drum 11, the developing gap H does not change and a good developing step is performed.

In the present embodiment, the two wall portions 50*a* and 50*b* are opening to the left in FIG. 12 so that the shaft portion 13*a*10 (13*a*20) can be inserted into and removed from the two wall portions 50*a* and 50*b* (cartridge casing 50). As a result, the shaft portion 13*a*10 (13*a*20) can be moved in a direction indicated by arrow of FIG. 12 to be detached from the cartridge casing 50, and the shaft portion 13*a*10 (13*a*20) can be moved in the opposite direction to be attached to the cartridge casing 50. In addition, the shaft portion 13*a*10 (13*a*20) can be moved (slidably moved) along the two wall portions 50*a* and 50*b*.

As described above, the process cartridge 10BK according to the present embodiment reduces time and effort involved in maintenance and replacement of the developing roller 13*a*. Specifically, when maintenance or replacement of the developing roller 13*a* (of the developing device 13) is performed, the developing roller 13*a* (of the developing device 13) can be attached to and detached from the process cartridge 10BK (cartridge casing 50) in a state to which the photoconductor drum 11 and the faceplate 40 are attached without taking time and effort to detach the photoconductor drum 11 and the faceplate 40 from the process cartridge 10BK (cartridge casing 50).

In particular, referring to FIGS. 11 and 12, in the present embodiment, each of the two wall portions 50*a* and 50*b* (restricting portions) is formed so as to be parallel to imaginary line S1 passing through the rotation center of the photoconductor drum 11 and the rotation center of the developing roller 13*a* when viewed in a cross-section orthogonal to the rotation center of the photoconductor drum 11 (first rotating body). As a result, the detachability of the developing roller 13*a* (of the developing device 13) with respect to the process cartridge 10BK is improved. On the other hand, the developing roller 13*a* receives pressure from the photoconductor drum 11 side, and the shaft portion 13*a*10 (13*a*20) readily moves along the wall portions 50*a* and 50*b*. However, such movement of the shaft portion 13*a*10 (13*a*20) is efficiently restricted by the restricting member 41.

Here, referring to FIGS. 10 and 11, in the present embodiment, the faceplate 40 as the positioning member is detachably coupled to the cartridge casing 50 (in the present embodiment, screw fastening is employed). The cartridge casing 50 is the housing of a process cartridge 10BK different from the developing case 13*r* and holds the charging device 12 and the cleaning device 15 in addition to the photoconductor drum 11. In addition to the developing roller 13*a*, the developing case 13*r* holds two conveying screws 13*b*1 and 13*b*2 and the doctor blade 13*c*. Specifically, the faceplate 40 has three screw through-holes into which a screw 60 can be inserted. Further, three female screw portions are formed on a side surface of the cartridge casing 50. Then, the screws 60 are screwed into the three female screw portions of the cartridge casing 50 respectively via the screw through-holes of the faceplate 40.

Here, the developing device 13 is formed so as to be detachably attached to the cartridge casing 50 (process cartridge 10BK) together with the developing roller 13*a* by moving the shaft portion 13*a*10 (13*a*20) of the developing roller 13*a* between the two wall portions 50*a* and 50*b* in a state in which the coupling of the restricting member 41 to the cartridge casing 50 is released (one screw 61 is removed).

Specifically, as illustrated in FIG. 11, in order to perform maintenance, replacement, and the like of the developing device 13, when the developing device 13 is detached from the process cartridge 10BK to which the developing device 13 is coupled via the restricting member 41, the process cartridge 10BK is first taken out from the image forming apparatus body 1. Then, as illustrated in FIG. 12, in the taken-out process cartridge 10BK, a screw 61 (one each is provided on each of the two faceplates 40 at both ends) that couples the restricting member 41 is removed. At this time, the photoconductor drum 11 and the faceplate 40 remain coupled to the cartridge casing 50. Then, as illustrated in FIG. 12, in a state where the restricting member 41 is removed, the developing device 13 is moved in the horizontal direction along the wall portions 50*a* and 50*b* of the cartridge casing 50, and the developing device 13 is removed from the process cartridge 10BK. At this time, in the process cartridge 10BK, components other than the developing device 13 (the photoconductor drum 11, the charging device 12, and the cleaning device 15) remain held in the cartridge casing 50. Note that, when the developing device 13 is attached to the process cartridge 10BK, the operation is performed in a procedure reverse to that at the time of detachment described above.

By configuring the process cartridge 10BK in this manner, time and effort involved in maintenance and replacement of the developing device 13 are reduced. Specifically, when maintenance or replacement of the developing device 13 is performed, the developing device 13 can be attached to and detached from the cartridge casing 50 without taking time and effort to detach the photoconductor drum 11 and the faceplate 40 from the cartridge casing 50.

In the process cartridge 10BK in the present embodiment, the angle of the developing roller 13*a* with respect to the photoconductor drum 11 is determined not by the faceplate but by the two wall portions 50*a* and 50*b* (restricting portions) provided in the cartridge casing 50 (wall portion). As a result, a defect that the angle of the developing roller 13*a* with respect to the photoconductor drum 11 deviates from a target value due to the accumulation of dimensional errors of a plurality of related components hardly occurs. In addition, the faceplate 40 in the present embodiment has just the function of defining the developing gap H and does not have the function of defining the angle of the developing roller 13*a* with respect to the photoconductor drum 11. Therefore, the yield of components is improved (can be easily manufactured) as compared with a faceplate having the function of defining the developing gap H and the angle.

First Modification

Figure 15A:
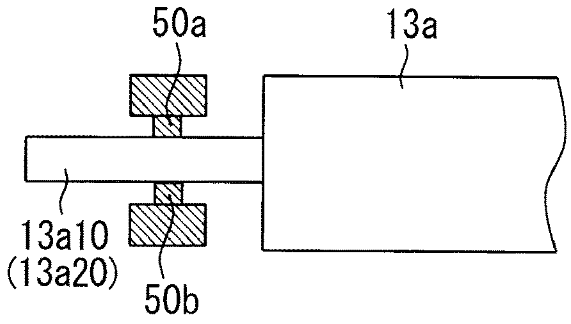
FIGS. 15A and 15B are schematic front views of a main part of a process cartridge according to a first modification of the embodiment illustrated in FIGS. 10 to 13.
Figure 15B:
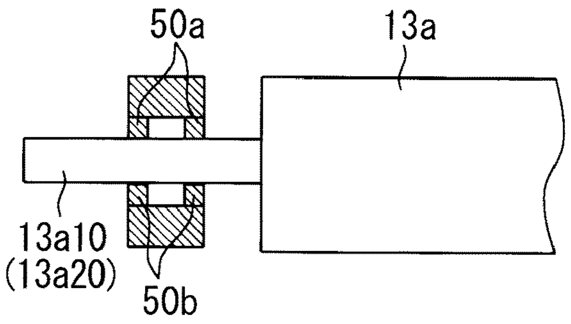

As illustrated in FIGS. 15A and 15B, the two wall portions 50*a* and 50*b* (restricting portions) in a first modification of the embodiment illustrated in FIGS. 10 to 13 are formed to have a thickness smaller than the thickness of the cartridge casing 50 (housing). Specifically, the upper and lower wall portions 50*a* and 50*b* illustrated in FIG. 15A are each formed to have a thickness smaller than the thickness of the cartridge casing 50 so as to reduce the contact area with the shaft portion 13*a*10 (13*a*20). The upper and lower wall portions 50*a* and 50*b* illustrated in FIG. 15B are each formed to be divided at intervals in the rotation axis direction so as to be in contact with the shaft portion 13*a*10 (13*a*20) at two positions. By setting the wall thicknesses (widths in the rotation axis direction) of the wall portions 50*a* and 50*b* to be small in this manner, a region to be dimensionally managed in manufacturing is reduced, so that the dimensions of the wall portions 50*a* and 50*b* can be easily set to target values. In addition, when the shaft portion 13*a*20 rotates, sliding friction with the shaft portion 13*a*20 can be reduced.

Second Modification

Figure 16A:
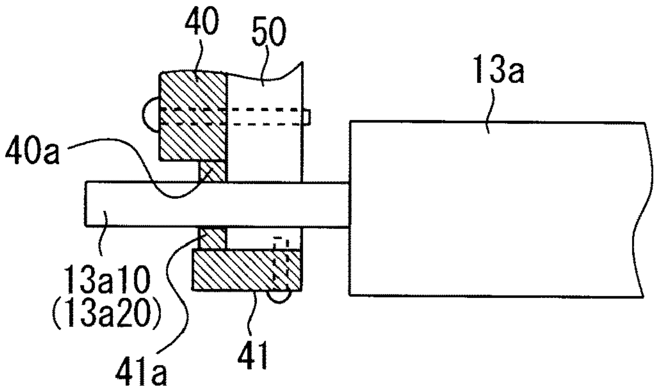
FIGS. 16A and 16B are schematic top views of a main part of a process cartridge according to a second modification of the embodiment illustrated in FIGS. 10 to 13.
Figure 16B:
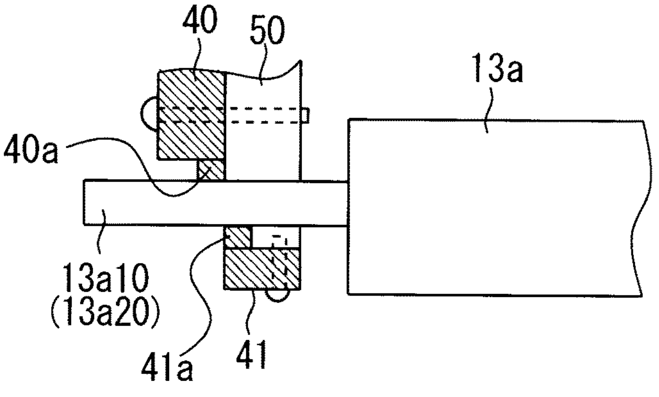

As illustrated in FIG. 16A, the faceplate 40 (positioning member) in a second modification of the embodiment illustrated in FIGS. 10 to 13 is formed such that the abutting portion 40*a* protrudes toward the shaft portion 13*a*10 (13*a*20) and abuts on the shaft portion 13*a*10 (13*a*20). In addition, the restricting member 41 is formed such that the contact part 41*a* protrudes toward the shaft portion 13*a*10 (13*a*20) and abuts on the shaft portion 13*a*10 (13*a*20). Further, the abutting portion 40*a* and the contact part 41*a* are arranged such that positions in the rotation axis direction of the abutting portion and the contact part (positions in the left-right direction in FIGS. 16A and 16B) coincide with each other. With such a configuration, as compared with a case where the abutting portion 40*a* and the contact part 41*a* are arranged to be largely separated in the rotation axis direction, a rotation moment is less likely to occur in the shaft portion 13*a*10 (13*a*20) sandwiched between the abutting portion 40*a* (faceplate 40) and the contact part 41*a* (restricting member 41), and a defect that the developing roller 13*a* is twisted is less likely to occur. Therefore, the developing gap H is accurately set in the rotation axis direction. As long as within a range that the developing roller 13*a* is not twisted, as illustrated in FIG. 16B, the abutting portion 40*a* and the contact part 41*a* may be arranged so as to be slightly shifted in the rotation axis direction.

Third Modification

Figure 17:
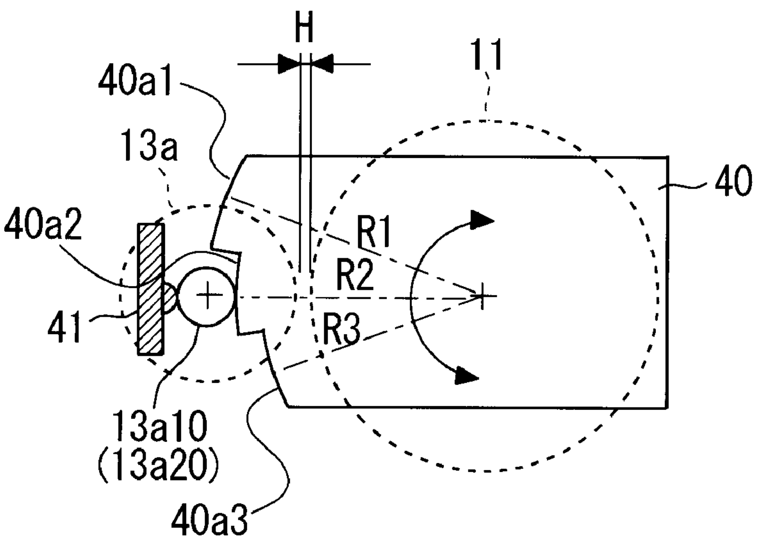
FIG. 17 is a view illustrating a positioning member according to a third modification of the embodiment illustrated in FIGS. 10 to 13.

As illustrated in FIG. 17, the faceplate 40 (positioning member) in a third modification of the embodiment illustrated in FIGS. 10 to 13 is also installed in the cartridge 50 (housing) so that the facing distance H between the photoconductor drum 11 (first rotating body) and the developing roller 13*a* (second rotating body) can be adjusted. Here, the faceplate 40 in the third modification is installed in the cartridge casing 50 so as to be rotatably movable in a direction indicated by double-headed arrow in FIG. 17 around the rotation center (drum shaft 11*a*) of the photoconductor drum 11. In addition, on the faceplate 40, a plurality of abutting portions 40*al* to 40*a*3 having different distances R1 to R3 (radii) from the rotation center of the photoconductor drum 11 are juxtaposed. With such a configuration, by changing the posture of the faceplate 40 in the rotation direction (by rotating the faceplate about the rotation center of the photoconductor drum 11), it is possible to switch the abutting portions 40*al* to 40*a*3 on which the shaft portion 13*a*10 (13*a*20) abuts and adjust the developing gap H to the desired value. Specifically, the above-described distances R1 to R3 have a relationship of R1>R2>R3, the developing gap H is the widest when the first abutting portion 40*al* abuts on the shaft portion 13*a*10 (13*a*20), the developing gap H is medium when the second abutting portion 40*a*2 abuts on the shaft portion 13*a*10 (13*a*20), and the developing gap H is the narrowest when the third abutting portion 40*a*3 abuts on the shaft portion 13*a*10 (13*a*20). In the third modification, the above-described distances R1 to R3 are set to get small in increments of 0.01 mm, and the developing gap H can be adjusted in increments of 0.01 mm. In the first modification, the abutting portions

40*al* to 40*a*3 of the faceplate 40 are formed in a stepped shape so that the developing gap H can be increased and decreased in multiple stages. On the other hand, the abutting portion of the faceplate 40 may be formed in a cam face shape to be able to continuously increase or decrease the developing gap H.

Fourth Modification

Figure 18:
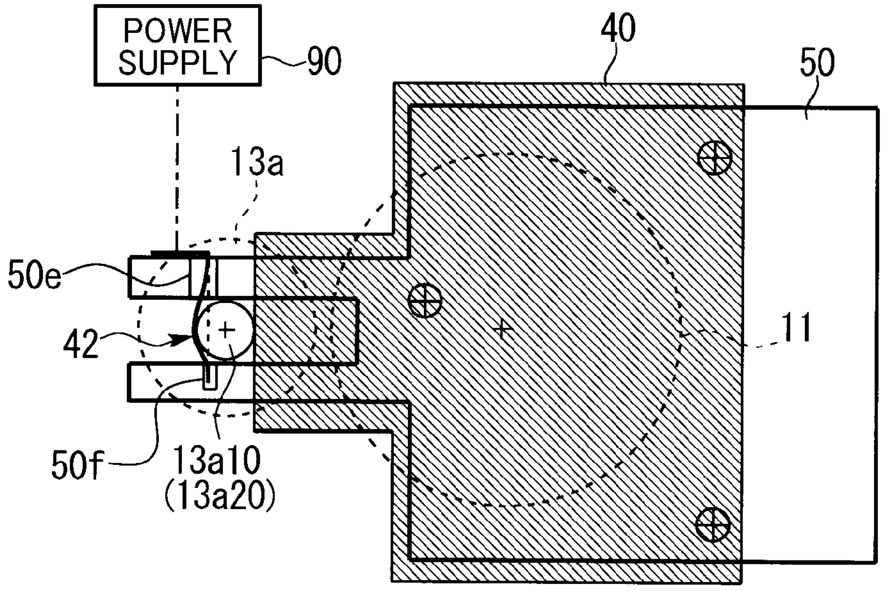
FIG. 18 is a view illustrating a main part of a process cartridge according to a fourth modification of the embodiment illustrated in FIGS. 10 to 13.

As illustrated in FIG. 18, in the wall portions 50*a* and 50*b* (restricting portions) in a fourth modification of the embodiment illustrated in FIGS. 10 to 13, as a restricting member that restricts movement of the shaft portion 13*a*10 (13*a*20), a leaf spring 42 as an elastic member that biases the shaft portion 13*a*10 (13*a*20) toward the faceplate 40 side (the right side of FIG. 18) is used. The leaf spring 42 (restricting member) as the elastic member is a metal plate formed in a substantially L shape and having conductivity and spring property. On the other hand, the wall portions 50*a* and 50*b* (restricting portions) are formed with insertion through-hole 50*e* into which the leaf spring 42 is inserted so as to be elastically deformable by abutment with the shaft portion 13*a*10 (13*a*20). The insertion through-hole 50*e* is a through-hole where a pressing portion (a portion excluding the bent portion) of the leaf spring 42 is inserted so as to be elastically deformable and that penetrates the upper wall portion 50*a*. The lower wall portion 50*b* is a portion into which the tip portion of the leaf spring 42 is inserted. The bent portion of the leaf spring 42 abuts on the upper surface of the upper wall portion 50*a* so as to be able to be in surface contact. In a case where the shaft portion 13*a*10 (13*a*20) does not exist (a state in which it is not elastically deformed), as indicated by a broken line in FIG. 18, the leaf spring 42 enters a range where the shaft portion 13*a*10 (13*a*20) is scheduled to be installed (within a range of an outer diameter of the shaft portion). Then, in a state where the shaft portion 13*a*10 (13*a*20) is installed, the leaf spring 42 is elastically deformed as indicated by a solid line in FIG. 18, and the shaft portion (developing roller 13*a*) is biased toward the photoconductor drum 11. As a result, the shaft portion 13*a*10 abuts on the abutting portion 40*a* (faceplate 40) in close contact, the inter-shaft distance between the photoconductor drum 11 and the developing roller 13*a* is defined, and the developing gap H (see FIG. 10) is accurately set to a target value. In particular, the tip portion of the leaf spring 42 in the fourth modification is detachably inserted into the recess 50*f*, so that the biasing force with respect to the shaft portion 13*a*10 (13*a*20) is easily secured. Therefore, the effect caused by the above-described shaft portion 13*a*10 (13*a*20) abutting so as to stick to the abutting portion 40*a* is easily exhibited.

Here, referring to FIG. 18, the process cartridge 10BK in the fourth modification is configured to apply a developing bias to the shaft portion 13*a*10 of the developing roller 13*a* via the leaf spring 42 (restricting member). Specifically, the leaf spring 42 is configured to be electrically connected to and disconnected from the power supply 90 installed in the image forming apparatus body 1 in conjunction with the operation in which the developing device 13 (process cartridge 10BK) is attached to and detached from the image forming apparatus body 1. Then, in a state where the developing device 13 (process cartridge 10BK) is attached to the image forming apparatus body 1, in a normal image forming process, as described above with reference to FIG. 2, a predetermined developing bias is applied from the power supply 90 to the developing roller 13*a* via the leaf spring 42, and the developing step is performed. By causing the leaf spring 42 to also function as an electrode for applying the developing bias in this manner, the device is reduced in size and cost as compared with a case where such an electrode is installed exclusively.

As described above, the process cartridge 10BK in the present embodiment is the holding device that rotatably holds the photoconductor drum 11 (first rotating body) and the developing roller 13*a* (second rotating body), in which the cartridge casing 50 (housing) that rotatably supports the photoconductor drum 11 is installed. In addition, the faceplate 40 (positioning member) on which the shaft portion 13*a*10 (13*a*20) of the developing roller 13*a* abuts and that defines the facing distance H between the photoconductor drum 11 and the developing roller 13*a* is installed in the cartridge casing 50. Further, the restricting member 41 that restricts movement of the shaft portion 13*a*10 (13*a*20) in a state of abutting on the faceplate 40 to move in a predetermined direction away from the faceplate 40 is detachably installed in the cartridge casing 50. The cartridge casing 50 is provided with the two wall portions 50*a* and 50*b* (restricting portions) that restrict movement of the shaft portion 13*a*10 (13*a*20) in a direction intersecting a predetermined direction restricted by the faceplate 40 and the restricting member 41. As a result, it is possible to reduce time and effort involved in maintenance and replacement.

In the present embodiment, the drum shaft 11*a* as the fitted portion of the photoconductor drum 11 (image bearer) is configured to be fitted into the through-hole as the fitting portion of the cartridge casing 50 (housing). However, the combination of the fitted portion of the image bearer and the fitting portion of the housing is not limited thereto, and for example, a concave flange as the fitted portion of the photoconductor drum 11 (image bearer) can be configured to be fitted into a convex member as the fitted portion of the housing. In the present embodiment, the photoconductor drum 11 is rotatably held by the cartridge casing 50 (housing), but the photoconductor drum 11 may be rotatably held by the faceplate 40. In the present embodiment, the two wall portions 50*a* and 50*b* are formed along the direction in which imaginary line S1 (imaginary line connecting the center of the drum shaft 11*a* and the center of the shaft portion 13*a*10) extends, but the direction in which the two wall portions 50*a* and 50*b* extend is not limited thereto. In the present embodiment, the two wall portions 50*a* and 50*b* are formed so as to extend in the horizontal direction, but the direction in which the two wall portions 50*a* and 50*b* extend is not limited thereto, and it is just required that the opening is not arranged so as to face the photoconductor drum 11. Such cases also provide substantially the same effects as the effects described above.

In the present embodiment, the present invention (the faceplate 40, the restricting member 41, and the two wall portions 50*a*, 50*b*) is applied to positioning units at both ends of the process cartridge 10BK. However, even if the positioning unit according to the present invention is installed just on one end portion in the rotation axis direction, in a case where the developing device 13 can be removed from the process cartridge 10BK just by removing the restricting member 41 on that one end portion, it is not required to apply the positioning unit according to the present invention to the positioning unit on the other end portion. In the present embodiment, the present invention is applied to the process cartridge 10BK (holding device) that rotatably holds the photoconductor drum 11 as the first rotating body and the developing roller 13*a* as the second rotating body. However, the application of the present invention is not limited thereto, and the present invention can be applied to all of a holding device, a first rotating body, and a second rotating body as long as the holding device rotatably holds the first rotating body and the second rotating body. Such cases also provide substantially the same effects as the effects described above.

Further, in the present embodiment, the present invention is applied to the process cartridge 10BK including the photoconductor drum 11 (image bearer), the developing device 13, the charging device 12, and the cleaning device 15, but the process cartridge to which the present invention is applied is not limited thereto, and the present invention can be applied to the one as long as including at least the photoconductor drum (image bearer) and the developing device (developer bearer). Such a case also provides substantially the same effects as the effects described above. Note that, in the present application, "a process cartridge" is defined as a unit in which at least one of a charging device that charges an image bearer, a developing device that develops a latent image formed on the image bearer, and a cleaning device that cleans the image bearer, and the image bearer are integrated and that is configured to be attached to and detached from an image forming apparatus body.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Further, the number, position, shape, and so forth of components are not limited to those of the present embodiment, and may be the number, position, shape, and so forth that are suitable for implementing the present invention.

This patent application is based on and claims priority to Japanese Patent Application No. 2020-152338, filed on Sep. 10, 2020 and Japanese Patent Application No. 2020-157218 filed on Sep. 18, 2020 in the Japan Patent Office, the entire disclosure of which is hereby incorporated by reference herein.

The invention claimed is:

1. A positioner, comprising:

a receiver into which a projection of a first rotating body is to be rotatably fitted;

a groove having a groove shape extending in a predetermined direction from an opening to an abutting region, wherein a shaft of a second rotating body is to be slidably movable in the groove; and a restrictor to restrict movement of the shaft in the predetermined direction in a state in which the shaft abuts on the abutting region in the groove, wherein the restrictor is detachably disposed on the groove, and wherein there is a gap between the first rotating body and the second rotating body such that there is a space between the first rotating body and the second rotating body along a line between a rotational axis of the first rotating body and the shaft of the second rotating body, and the first rotating body and the second rotating body do not contact each other.

2. The positioner according to claim 1, wherein the abutting region of the groove includes an arc-shaped surface region having substantially a same diameter as an outer diameter of the shaft.

3. The positioner according to claim 1, wherein the abutting region of the groove includes a face formed in an arc shape around a rotation center of the receiver.

4. The positioner according to claim 1, wherein the abutting region of the groove includes two surface regions whose facing distance gradually decreases toward the receiver.

5. The positioner according to claim 1, wherein the predetermined direction is a direction in which an imaginary line passing through a center of the receiver and a center of the abutting region extends.

6. The positioner according to claim 1, wherein the restrictor includes an elastic structure to bias the shaft toward the projection.

7. The positioner according to claim 6, wherein the elastic structure is a leaf spring of a substantially L shape, and wherein the positioner includes:

an insertion through-hole into which a pressing region excluding a bent region of the leaf spring is inserted to be elastically deformable and intersects and communicates with the groove; and a planar region on which the bent region of the leaf spring abuts in a surface-contactable manner.

8. The positioner according to claim 7, wherein the leaf spring includes a convex region to make point contact with the shaft disposed at the abutting region.

9. The positioner according to claim 7, wherein the positioner includes a fixing region into which a tip of the pressing region of the leaf spring having passed through the groove is inserted and fixed.

10. A process cartridge, comprising:

an image bearer as the first rotating body; and a developing device in which a developer bearer as the second rotating body is rotatably held, wherein the developing device is detachably installed in the process cartridge, and wherein the positioner according to claim 1 is detachably disposed at least on one end in a rotation axis direction of the developing bearer.

11. The process cartridge according to claim 10, further comprising:

another positioner defining a facing distance between the image bearer and the developer bearer is detachably disposed on another end in the rotation axis direction of the developing bearer, wherein said another positioner includes:

a receiver into which a projection of the image bearer is rotatably fitted; and a positioning through-hole into which the shaft of the second rotating body which is the developer bearer is fitted via a detachable bearing, wherein the positioner is disposed on the one end in the rotation axis direction of the developing bearer, and wherein said another positioner is detachably disposed on another end in the rotation axis direction of the developing bearer.

12. The process cartridge according to claim 10, wherein a developing bias is applied to the shaft of the developer bearer via the restrictor of the positioner.

13. An image forming apparatus, comprising the positioner according to claim 1, wherein the positioner is detachably disposed in the image forming apparatus.

14. A holder, comprising:

a housing rotatably supporting a first rotating body;

a positioner disposed in the housing and on which a shaft of a second rotating body abuts to define a facing distance between the first rotating body and the second rotating body; and a restrictor detachably installed in the housing to restrict movement of the shaft in a predetermined direction away from the positioner in a state in which the shaft abuts on the positioner, wherein the housing includes a section to restrict movement of the shaft in a direction intersecting the predetermined direction, and wherein there is a gap between the first rotating body and the second rotating body such that there is a space between the first rotating body and the second rotating body along a line between a rotational axis of the first rotating body and the shaft of the second rotating body, and the first rotating body and the second rotating body do not contact each other.

15. The holder according to claim 14, wherein the section to restrict of the housing includes two walls facing each other with the shaft interposed between the two walls.

16. The holder according to claim 15, wherein each of the two walls is parallel to the line.

17. The holder according to claim 15, wherein each of the two walls protrudes in a direction away from the first rotating body with respect to the housing, and wherein a base of the two walls is disposed at a position closer to the first rotating body than an abutting region at which the positioner abuts on the shaft.

18. The holder according to claim 15, wherein one end of the restrictor is held by one of the two walls, and another end of the restrictor is fitted into a recess in another one of the two walls to restrict movement in a direction away from the first rotating body.

19. The holder according to claim 14, wherein:

the positioner includes an abutting region protruding toward the shaft and abutting on the shaft, the restrictor includes a contact part protruding toward the shaft and contacting the shaft, and the abutting region and the contact part are arranged such that positions of the abutting region and the contact part in a rotation axis direction of the first rotating body coincide with each other.

20. The holder according to claim 14, wherein the positioner is disposed in the housing such that the facing distance between the first rotating body and the second rotating body is adjustable.

* * * * *